US007133070B2

(12) United States Patent
Wheeler et al.

(10) Patent No.: US 7,133,070 B2
(45) Date of Patent: Nov. 7, 2006

(54) SYSTEM AND METHOD FOR DECIDING WHEN TO CORRECT IMAGE-SPECIFIC DEFECTS BASED ON CAMERA, SCENE, DISPLAY AND DEMOGRAPHIC DATA

(75) Inventors: Richard B. Wheeler, Webster, NY (US); Brian W. Keelan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 934 days.

(21) Appl. No.: 09/957,013

(22) Filed: Sep. 20, 2001

(65) Prior Publication Data

US 2003/0095197 A1  May 22, 2003

(51) Int. Cl.
  H04N 9/73   (2006.01)
  H04N 5/217  (2006.01)
  H04N 5/208  (2006.01)
(52) U.S. Cl. .................... 348/223.1; 348/341; 348/252
(58) Field of Classification Search ........... 348/231.99, 348/231.3, 222.1, 241, 231.6, 252
  See application file for complete search history.

(56) References Cited

U.S. PATENT DOCUMENTS

| | | | |
|---|---|---|---|
| 4,731,671 A | | 3/1988 | Alkofer |
| 4,945,406 A | | 7/1990 | Cok |
| 5,012,333 A | | 4/1991 | Lee et al. |
| 5,229,810 A | | 7/1993 | Cloutier et al. |
| 5,323,203 A | * | 6/1994 | Maruyama et al. ........... 396/57 |
| 5,323,204 A | | 6/1994 | Wheeler et al. |
| 5,398,077 A | | 3/1995 | Cok et al. |
| 5,404,196 A | * | 4/1995 | Terashita et al. ............... 355/77 |
| 5,432,863 A | * | 7/1995 | Benati et al. ................ 382/167 |
| 5,649,260 A | | 7/1997 | Wheeler et al. |
| 5,694,484 A | | 12/1997 | Cottrell et al. |
| 5,739,924 A | * | 4/1998 | Sano .......................... 358/487 |

(Continued)

FOREIGN PATENT DOCUMENTS

EP  0 532 047 A2  3/1993

(Continued)

OTHER PUBLICATIONS

"Modern Exposure Determination for Customizing Photofinishing Printer Response" by E. Goll, D. Hill and W. Severin. Journal of Applied Photographic Engineering, 2, 93 (1979), pp. 93-104.

(Continued)

*Primary Examiner*—Tuan Ho
*Assistant Examiner*—Timothy J. Henn
(74) *Attorney, Agent, or Firm*—David M. Woods

(57) ABSTRACT

A captured image is processed with one or more correction processes selected from a plurality of such processes, each associated with correction of a specific type of image defect, in order to improve the appearance of a viewed image generated from the captured image. Preliminary to the image processing, meta data related to image capture is obtained that is unique to each captured image, where the meta data is capable of indicating whether the specific types of image defects are likely to be present in the viewed image generated from the captured image. The processing then involves predicting the presence of the image defects based at least in part on the meta data, thereby generating process application criteria which indicate a level of image defect that if left untreated would reduce the perceived quality of the viewed image; selecting one or more correction processes to employ on the captured image based on the process application criteria; and applying the one or more selected correction processes to the captured image to generate the viewed image.

35 Claims, 8 Drawing Sheets

U.S. PATENT DOCUMENTS

| | | | |
|---|---|---|---|
| 5,748,764 A | | 5/1998 | Benati et al. |
| 5,822,453 A | | 10/1998 | Lee et al. |
| 5,835,627 A | | 11/1998 | Higgins et al. |
| 5,892,837 A | | 4/1999 | Luo et al. |
| 6,011,547 A | * | 1/2000 | Shiota et al. ............... 382/254 |
| 6,044,156 A | | 3/2000 | Honsinger et al. |
| 6,133,983 A | | 10/2000 | Wheeler |
| 6,151,403 A | | 11/2000 | Luo |
| 6,292,574 B1 | * | 9/2001 | Schildkraut et al. ........ 382/117 |
| 6,727,951 B1 | * | 4/2004 | Silverbrook ................ 348/362 |
| 2003/0007078 A1 | * | 1/2003 | Feldis ..................... 348/231.6 |
| 2003/0025811 A1 | * | 2/2003 | Keelan et al. .............. 348/239 |

FOREIGN PATENT DOCUMENTS

| | | |
|---|---|---|
| EP | 0 838 939 A2 | 4/1998 |
| EP | 1 292 108 A2 | 3/2003 |

OTHER PUBLICATIONS

"Characterization and Prediction of Image Quality" by Brian W. Keelan. The Society for Imaging Science and Technology (IS&T), Image Processing Image Quality Image Capture Systems (PCIS 2000) Conference, ISBN: 0-89298-227-5, pp. 197-203.

"Use of System Image Quality Models to Improve Product Design" by Richard B. Wheeler. the Society for Imaging Science and Technology (IS&T), Image Processing Image Quality Image Capture Systems (PICS 2000) Conference, ISBN: 0-89298-227-5, pp. 204-208.

"Digital Image Smoothing and the Sigma Filter" by Jong-Sen Lee. Computer Vision, Graphics,a nd Image Processing 24, 1983, pp. 255-269.

"System Specifications for the Advanced Photo System" found on the http://www.kodak.com website.

"Practical Digital Image Processing", Rhys Lewis, Ellis Horward, New York, 1990, p. 248.

"Algorithms For Image Processing and Computer Vision", J.R. Parker, John Wiley & Sons, Inc., New York, 1997, pp. 3-5.

\* cited by examiner

SYSTEM AND METHOD FOR DECIDING WHEN TO CORRECT IMAGE-SPECIFIC DEFECTS BASED ON CAMERA, SCENE, DISPLAY AND DEMOGRAPHIC DATA

FIELD OF THE INVENTION

This invention relates generally to the field of digital image processing, and, in particular, to the prediction and correction of image defects in a photograph.

BACKGROUND OF THE INVENTION

Photographic systems produce a wide range of image quality when operated by amateur, often referred to as "point-and-shoot", photographers. If the photographic environment for a given scene is well suited to the image capture system (e.g. subjects are stationary and within the focus range, ambient light level is uniform and of sufficient intensity, and lens magnification is appropriate for the subject matter), good results are typically obtained. However, when these conditions are not present, image defects may be introduced due to failures in the capture or reproduction system, thereby reducing the quality of the final viewed image. To minimize the effects of suboptimal image capture conditions, camera designers have attempted to compensate by adding features intended to expand the range of light levels and distances where images can be captured. Unfortunately, these features often solve the primary problem, but add a secondary, sometimes severe, image defect.

For example, if the intensity of the ambient light is insufficient to provide adequate exposure, and the primary subject is located less than 20 feet from the camera, most built-in electronic flash units are able to provide auxiliary illumination sufficient to at least partially expose the primary subject. However, even if the primary subject now receives adequate illumination, the flash may introduce image defects.

As is well known in the art, the image defect known as redeye may occur when the angle between a narrow light source, the photographic subject, and the camera lens is less than approximately three degrees. This criterion is frequently met in flash exposures from compact cameras. The light from the flash enters the pupil nearly on-axis and propagates to the fundus of the eye, where it is reflected back out of the eye, having been colored red by the blood vessels in the fundus. The light exits the eye in a narrow cone, and if the camera lens falls within that cone, the red reflection will be recorded, and may appear in the final image as a red glow in the pupils, which is very undesirable in terms of image quality.

Redeye is more objectionable when the size of the pupil in the viewed image is larger and when the red saturation of the pupil is greater. The former may occur when the pupil is dilated, as occurs at low ambient light levels, or when the subject is rendered at a larger size in the image, for example due to shorter camera to subject distance, longer camera lens focal length, higher printing magnification (including zoom and crop), and/or shorter viewing distance. The primary techniques used in the camera to reduce or eliminate redeye are: increasing flash to lens separation; firing a preflash to transiently stop down the pupil in response to the bright light; and decreasing lens focal length and/or electronic zoom.

While all these methods are efficacious, all have associated disadvantages. Increased flash-lens separation may lead to more expensive and bulkier cameras and produces more noticeable shadows due to the farther off-axis lighting. After a preflash is fired, the eye requires half a second or more to respond fully, and during this delay between the preflash fire and the image capture, facial expressions of the subject often change in an undesirable fashion due to the annoyance and surprise of the preflash. The preflash also increases camera cost, reduces the power available during the main flash pulse, and increases battery consumption. Finally, restriction of optical or electronic zoom factors interferes with the photographer's ability to obtain the desired composition, with the subjects appearing large enough in the image to provide a pleasing rendition.

Given the disadvantages of the in-camera redeye reduction techniques summarized above, and the increased availability of digital printing devices capable of making corrections to selected portions of individual images, considerable effort has been directed towards the development of techniques for locating and correcting the redeye defect during the photofinishing (digital printing) process.

U.S. Pat. No. 5,748,764 issued 5 May 1998 teaches a method of locating and correcting the redeye image defect in an image. U.S. Pat. No. 5,892,837 issued 6 Apr. 1999, and related commonly assigned US. Pat. No. 6,292,574 issued Sep. 18, 2001 and U.S. Pat. No. 6,151,403 issued Nov. 21, 2000 generally describe additional methods suitable for locating human eyes in an image, and specifically describe locating and correcting the appearance of human eyes with the redeye image defect. These digital redeye removal techniques, while effective, are computationally intensive, and therefore increase the time required to optimally render and reproduce copies of captured images. The time required to perform these operations may in some cases be the rate limiting step in automated high speed printing operations. If the redeye defect location and correction processes are applied to every image in a customer order, even though only a portion of those images actually contain the defect, productivity and profit may be reduced. In addition, if computational time is spent searching for redeye defects in every image, other beneficial image processing operations such as tone scale mapping, digital noise reduction and sharpening may not be possible in the time interval allocated for each image. It is therefore desirable to be able to predict when redeye will occur, and to invoke the redeye location and correction processes only when needed.

From an extensive study to determine whether it is possible to predict from data collected at the time the original scene is photographed, the probability and severity of the redeye defect that will be present in the final image, it was discovered that the extent of the redeye defect depends primarily on the following factors: subject race, subject age, preflash illumination level, flash-to-lens separation, camera to subject distance, ambient light level, camera lens focal length, reproduction magnification, and final image viewing distance. In the present invention these factors are used to predict, on an image by image basis, the severity of the redeye defect, and that information is transferred from the camera to the photofinishing system where it commands the automatic printer control system, or in the case of human assisted printers, alerts the operator, to apply redeye defect location and correction techniques only when warranted, thereby improving picture quality and enhancing photofinishing productivity.

In addition to the redeye image defect, it is well-known that the physics of light intensity loss as a function of distance from a narrow source, such as an electronic flash tube, often leads to a defect in lighting contrast and consequently distorted tone reproduction in the final viewed image. Specifically, with every doubling of camera-to-subject distance, the light intensity per unit area on the subject drops by a factor of four. For example, if the primary subject is located 6 feet from the camera and the background is located 12 feet from the camera, the captured image of the background has an exposure level only one quarter that of the image of the primary subject. This causes the background to appear much darker than the primary subject does in the final viewed image. Because light falls off according to this squared function with respect to distance, the exposure difference between the primary subject and the background are often larger than illustrated above, particularly when images are captured outdoors at night or in large rooms. When presented with an image having a large exposure range (high contrast scene) with no knowledge of which portion of the scene is the primary subject, the exposure control system in the printer often calculates an average or area-weighted exposure that may excessively lighten the primary subject. This defect is particularly detrimental in pictures of people, whose faces are washed out and lack proper flesh reproduction.

If images of high contrast scenes universally contained overexposed primary subjects and underexposed backgrounds, as illustrated above, it would be practical to introduce a darken bias when printing all high contrast scenes. Unfortunately, there is a class of scenes known as backlight that are high in contrast, but have a subject-to-background exposure ratio that is opposite that of flash scenes. In the case of backlight scenes the illumination source is often behind the primary subject, or the primary subject is shaded by another object, such as a tree or a building, and therefore receives only a fraction of the ambient illumination. Consequently, the primary subject is underexposed relative to the background. In this case if the darkening bias needed to correct harsh flash scenes was applied, the already dark primary subject would be rendered even darker, having the effect of further reducing the image quality.

The information exchange (IX) feature of the Advanced Photo System offered by Eastman Kodak Company may make use of information collected at the time of image capture and passed to the printer to indicate whether, for the current image, the electronic flash was employed. (The Advanced Photo System specifications documents can be found at http://www.kodak.com/global/en/consumer/APS/redBook/specsIndex.shtml.) If the flash was fired, and a high contrast scene is inferred from the scanned image densities, a darkening bias can be applied to the image during printing. This information helps discriminate between backlight and harsh flash shots, and increases the probability that the primary subject will be printed to the proper lightness. However, because in both backlight and harsh flash scenes the dynamic range of the scene may exceed the tonal range of the print material, the primary subject and background can not be simultaneously rendered properly by invoking a full-image-field darken (in the case of harsh flash) or lighten (in the case of backlight) printing correction. This means that optical (analog) printing systems, which are only capable of producing full-field exposure corrections, can not produce optimal renditions of high contrast scenes.

Recent advances in digital image processing make practical methods for digitally segmenting the image field, analyzing the dynamic range, and adjusting tone reproduction (lightening or darkening) on an image area specific basis. By remapping the tone reproduction in this fashion, both the overexposed and underexposed portions of high contrast scenes can be rendered within the tonal range of the print material, thereby making the information in both regions visible in the final image. These digital area-specific tone scale remapping techniques, while effective, are computationally intensive, and therefore increase the time required to optimally render and reproduce copies of captured images. The time required to perform these operations may in some cases be the rate limiting step in automated high speed printing operations. If the tone scale remapping techniques are applied to every image in a customer order, even though only a portion of those images actually contain the defect, productivity and profit may be reduced. In addition, if computational time is spent searching for tone scale defects in every image, other beneficial image processing operations such as redeye location and correction, digital noise reduction and sharpening may not be possible in the time interval allocated for processing each image. It is therefore desirable to be able to predict when tone scale defects will be present, and to invoke tone scale remapping processes only when needed.

From a study to determine whether it is possible to predict from data collected at the time the original scene is photographed, the probability and severity of the tone scale defect that will be present in the final image, it was discovered that the extent of the tone scale defect depends primarily on the following factors: flash state (full,fill,off), primary subject light level, background light level, primary subject distance, background distance, and if available, state of the manual or automatic camera backlight exposure compensation control. In the present invention, these factors are used to predict, on an image by image basis, the severity of the tone scale defect, and that information is transferred from the camera to the photofinishing system where it commands the automatic printer control system, or in the case of human assisted printers, alerts the operator, to apply tone scale defect location and correction techniques only when warranted, thereby improving picture quality and enhancing photofinishing productivity.

If the ambient light level is not sufficient to provide adequate exposure, and the flash is deactivated or the primary subject is located beyond the maximum flash range, the image capture system will produce an underexposed image. In the case of film-based camera systems underexposure leads to latent image formation in primarily the most sensitive (fastest) layer, comprised of the largest silver halide grains. When processed and printed, images comprised of these fast, large grains permit a reproduction of the scene to be created, but the final viewed image typically contains noticeable grain structure, which masks fine detail and lowers the perceived image quality. The appearance of the grain, referred to more generally as image noise, becomes more objectionable when the reproduction magnification is increased, for example, in enlargements, pseudo-panoramic or pseudo-telephoto print formats.

In the case of digital still cameras (DSCs) with, for example, CCD or CMOS image sensors, the photographic sensitivity (exposure index) of the sensor may be adjusted automatically or manually, by the photographer, in response to the scene light level, to attempt to maintain adequate tone reproduction. The photographic sensitivity is adjusted by changing the gain of the sensor signal amplifier, taking into account the color temperature (white balance) of the ambient illuminant. When the ambient light level is high (bright scene), the amplifier gain is low, thereby producing a high (favorable) signal-to-noise ratio (SNR). When the ambient light level is low (dim scene), the amplifier gain is increased, which produces a low (unfavorable) SNR. When the gain is increased in this fashion, the tone reproduction of the image is improved relative to the standard amplifier gain; however, due to the low SNR, the final viewed image will typically contain noticeable noise, analogous to the grain in underexposed film images, which masks fine detail and lowers the perceived image quality. The appearance of noise defects becomes more objectionable when the reproduction magnification is increased, for example, in enlargements, pseudo-panoramic or pseudo-telephoto (electronic zoom) print formats.

Techniques such as those exemplified in The Sigma filter, described by Jong-Sen Lee in the journal article *Digital Image Smoothing and the Sigma Filter*, Computer Vision, Graphics, and Image Processing Vol 24, p. 255–269, 1983, are useful as noise reduction algorithms to enhance the visual appearance of the processed digital image. These digital area-specific noise reduction techniques, while effective, are computationally intensive, and therefore increase the time required to optimally render and reproduce copies of captured images. The time required to perform these operations may in some cases be the rate limiting step in automated high speed printing operations. If the digital noise reduction techniques are applied to every image in a customer order, even though only a portion of those images actually contain the defect, productivity and profit may be reduced. In addition, if computational time is spent searching for and correcting noise defects in every image, other beneficial image processing operations such as redeye location and correction, tone scale remapping and sharpening may not be possible in the time interval allocated for processing each image. It is therefore desirable to be able to predict when noise defects will be present, and to invoke digital noise reduction processes only when needed.

From an extensive study to determine whether it is possible to predict from data collected at the time the original scene is photographed, the probability and severity of the noise defect that will be present in the final image, it was discovered that the extent of the noise defect depends primarily on the following factors: Reproduction magnification; final image viewing distance; baseline exposure index film noise, or, in the case of DSCs, baseline exposure index sensor noise and the state of the manual or automatic DSC (R,G,B) exposure index control, which determines the sensor amplifier gain level; and the film or the sensor exposure level. In the present invention these factors are used to predict, on an image by image basis, the severity of the noise defect, and that information is transferred from the camera to the photofinishing system where it commands the automatic printer control system, or in the case of human assisted printers, alerts the operator, to apply noise defect location and correction techniques only when warranted, thereby improving picture quality and enhancing photofinishing productivity.

Even if the photographic environment provides ambient light that is uniform and of sufficient intensity to provide an exposure level that obviates the need for electronic flash or high-noise ambient captures, and the primary subject is within the focus range of the camera, the camera lens magnification provided by the normal lens (often defined as the diagonal dimension of the image capture frame) may be insufficient to capture an image of the primary subject that is the preferred size in the final viewed image. The size of the primary subject in the final viewed image is proportional to a quantity known as the angular magnification (AM) of the system, which can be characterized by the following equation:

$$AM=[(Fl)(Mr)]/Vd$$

Where:
Fl=camera lens focal length (specified in inches)
Mr=reproduction magnification (ratio of image to display size)
Vd=final image viewing distance (specified in inches)

The eye-to-display separation (viewing distance) has been found to vary with respect to final display size according to the following formula disclosed by the present inventors, in columns 43–44 of commonly-assigned U.S. Pat. No. 5,323,204:

$$Vd=3.64+11.34[\log_{10}(D)]$$

Where:
D=the diagonal dimension of the final display (specified in inches)

The most common method for increasing the AM involves the inclusion of telephoto or variable (zoom) focal length image capture optics on the camera. This approach produces larger subjects in the final viewed image by increasing the image capture magnification and maintaining a standard (full frame) printing magnification. Other methods involving pseudo-telephoto optical printing or electronic zoom digital printing are well known in the art. These techniques produce larger subjects in the final viewed image by increasing the printing magnification and cropping out a portion of the image frame, while retaining the standard print size (e.g. 4×6 inch) and the standard image capture lens focal length. Finally, by simply producing a larger (e.g. 8×10 inch) final image size, the reproduction magnification is increased, and therefore the AM and perceived subject size, even after including the longer final viewing distance, are also larger. The increase in AM provided by the aforementioned techniques may lead to a more pleasing composition, however, it also magnifies image blur resulting from inadequate lens depth-of-field, subject motion, and photographer hand tremor. The magnified image blur causes sharpness defects to be visible in the final viewed image.

Recent advances in digital image sharpness enhancement, as exemplified in U.S. Pat. No. 5,398,077, teach methods for digitally segmenting the image field, analyzing the content to separate signal and noise components, and boosting the sharpness on an image area specific basis. These digital area-specific sharpening techniques, while effective, are computationally intensive, and therefore increase the time required to optimally render and reproduce copies of captured images. The time required to perform these operations may in some cases be the rate limiting step in automated high speed printing operations. If the digital sharpening techniques are applied to every image in a customer order, even though only a portion of those images actually contain the defect, productivity and profit may be reduced. In addition, if computational time is spent searching for and correcting sharpness defects in every image, other beneficial image processing operations such as redeye location and correction, tone scale remapping and noise reduction may not be possible in the time interval allocated for processing each image. It is therefore desirable to be able to predict when sharpness defects will be present, and to invoke digital sharpening processes only when needed.

From an extensive study to determine whether it is possible to predict from data collected at the time the original scene is photographed, the probability and severity of the sharpness defect that will be present in the final image, it was discovered that the extent of the sharpness defect depends primarily on the following factors: reproduction magnification, final image viewing distance, camera lens focal length, DSC resolution or camera film speed, shutter time, subject motion, photographer hand tremor, and subject distance if outside of focus range. In the present invention, these factors are used to predict, on an image by image basis, the severity of the sharpness defect, and that information is transferred from the camera to the photofinishing system where it commands the automatic printer control system, or in the case of human assisted printers, alerts the operator, to apply sharpness defect location and correction techniques only when warranted, thereby improving picture quality and enhancing photofinishing productivity.

One proposal for optimizing multiple image processing operations is described in U.S. Pat. No. 5,694,484, issued Dec. 2, 1997, to Cottrell et al. Cottrell et al. disclose an image processing system that proposes to optimize the perceptual quality of images undergoing a series of image-processing operations selected by an operator. The system consists of a set of selected image-processing operations, an architecture, and a control system. These elements take into consideration profiles of source characteristics from which the images are generated, profiles of output device characteristics, and the impact that image processing operations (individually or in concert) will have on perceived image quality. Control parameters for the individual image processing operations are modified by optimizing an image quality metric (a single numerical quality) based on mathematical formulas relating objective metrics (such as sharpness, grain, tone, and color) with perceived image quality. In the method described by Cottrell et al., the values for the individual control parameters are varied over useful ranges until the image quality metric achieves an optimal value. Besides involving significant computation resources to evaluate the multitude of parameter permutations, this method requires operator intervention to select the set of image processing operations that will be applied in each case.

In U.S. Pat. No. 5,835,627, issued Nov. 10, 1998 to Higgins, Hultgren and Cottrell, the process described above in the '484 patent is refined with the addition of an algorithm selector that tries each possible sequence of image processing operations and a customer satisfaction index (CSI), which proposes to balance the perceived image quality and the image processing time, as exhibited by the different image processing sequences. As was the case in U.S. Pat. No. 5,694,484, the image quality estimate is based on device profiles that are constant value inputs for each image source and downstream device, and that are typically generated during calibration of the individual devices in a factory or laboratory setting (see U.S. Pat. No. 5,835,627, col. 3, line 60–65). Besides involving significant computation resources to evaluate the multitude of parameter permutations as in the '484 patent, this refinement increases the amount of computation by causing the process to iterate through each new sequence until an optimal CSI is obtained.

Despite the elaborate methodology disclosed in U.S. Pat. Nos. 5,694,484 and 5,835,627, such systems fail to recognize the importance and use of capture-specific data, that is, variable data collected at the time of image capture, to predict on an image by image basis the best selection of image defect correction algorithms to apply. In particular, it would be desirable to make advantageous use of scene- and exposure-specific data to predict the best selection of image defect correction algorithms to apply.

SUMMARY OF THE INVENTION

It is an object of the present invention to improve the quality and efficiency of digital printing by applying image defect location and correction processes only when the current image is predicted to have a level of image defect that if left untreated would reduce the perceived quality of the final viewed image.

It is a further object to make use of camera, scene, and demographic data collected at the time of image capture to predict on an image by image basis the best selection of image defect correction algorithms to apply.

The present invention is directed to overcoming one or more of the problems set forth above. Briefly summarized, according to one aspect of the present invention, the invention resides in a system and method for processing a captured image with one or more correction processes selected from a plurality of such processes, each associated with correction of a specific type of image defect, in order to improve the appearance of a viewed image generated from the captured image. The inventive method includes the steps of (a) collecting meta data related to image capture that is unique to each image that is captured, wherein the meta data is capable of indicating whether the specific types of image defects are likely to be present in the viewed image generated from the captured image; (b) predicting the presence of the image defects based at least in part on the meta data, thereby generating process application criteria which indicate a level of image defect that if left untreated would reduce the perceived quality of the viewed image; (c) selecting one or more correction processes to employ on the image based on the process application criteria; and (d) applying the one or more selected correction processes to the image to generate the viewed image.

The meta data, which may be collected at the time of image capture or at some other time to the extent possible, such as at a photofinishing kiosk, includes scene, camera or demographic data specifically related on an image-by-image basis to the image capture. Moreover, the step of predicting the presence of the image defects may also predict the severity of the defects and the strength of the corresponding correction process can be altered in response to the degree of severity. In addition, the collection of meta data may further include the collection of display parameters of the viewed image generated from each image that is captured, wherein such display parameter meta data is also capable of indicating whether the different types of image defects are likely to be present in the viewed image.

Advantageous Effect of the Invention

The present invention is advantageous in that it improves the quality and efficiency of digital photofinishing processes, whether fully automated or operator assisted. Specifically, the advantage is realized by applying image defect location and correction processes only when needed for the current scene, thereby eliminating time consuming operations that would fail to substantially improve the quality of the current image.

DETAILED DESCRIPTION OF THE INVENTION

Figure 1:
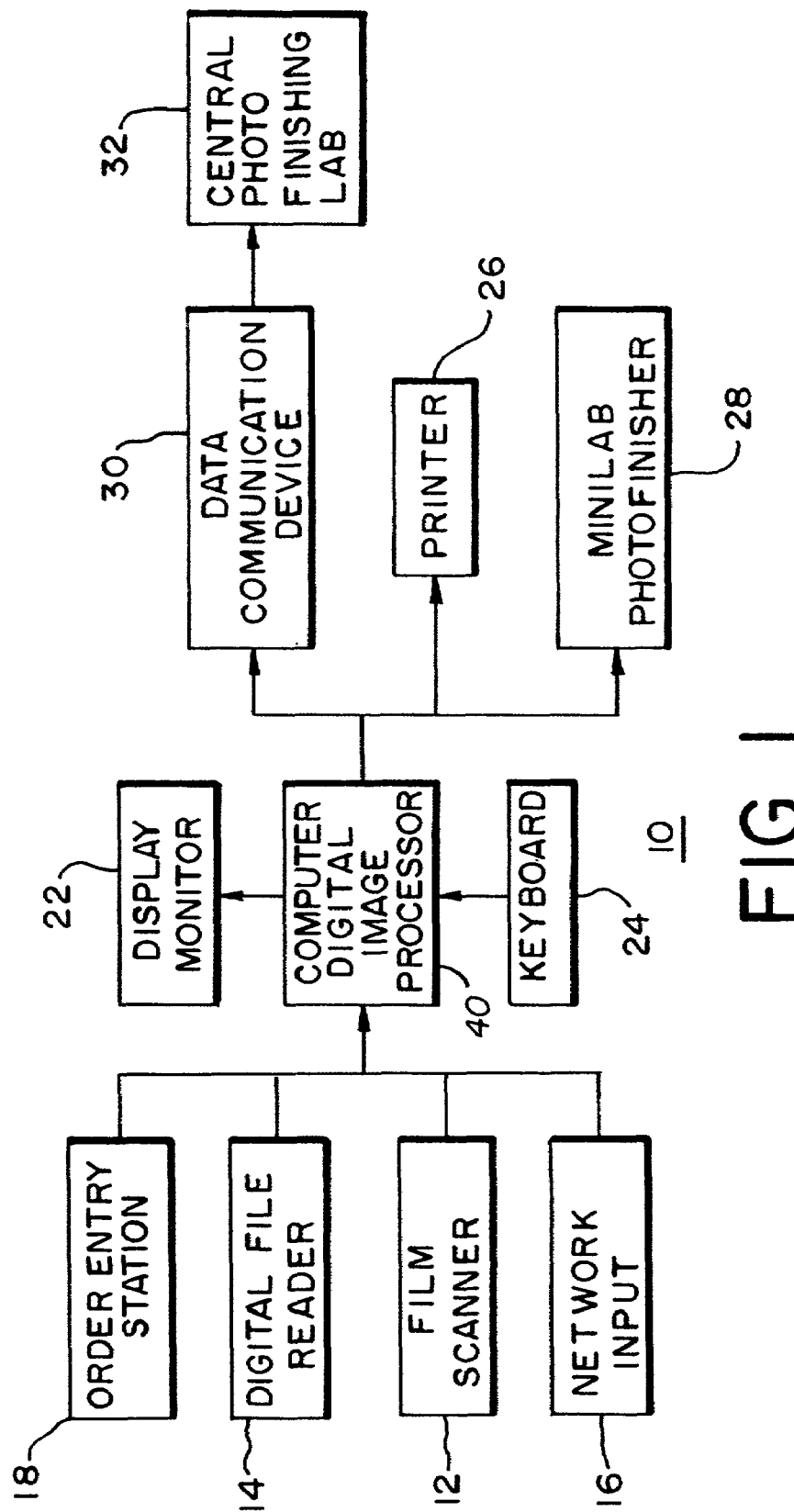
FIG. 1 is a block diagram of a digital image reproduction system according to the invention.

Because image processing systems employing defect recognition and correction are well known, the present description will be directed in particular to attributes forming part of, or cooperating more directly with, system and method in accordance with the present invention. System and method attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Prior to providing a detailed description of each embodiment of the present invention, the methods used to set the image quality switch-points for activating the image defect location and correction processes will be discussed. Because it is the purpose of this invention to predict from data collected at the time of image capture the presence and severity of image defects, to determine which correction processes to employ, each of the defects must be assessed with respect to the same image quality standard. To accomplish this goal, perceptually relevant image quality assessment and modeling techniques disclosed by the present inventors in the proceedings of The Society for Imaging Science and Technology (IS&T), Image Processing Image Quality Image Capture Systems (PICS 2000) Conference, ISBN: 0-89298-227-5, are employed. Specifically, the papers entitled *"Characterization and Prediction of Image Quality"* by B. W. Keelan, and *"Use of System Image Quality Models to Improve Product Design"* by R. B. Wheeler, which are incorporated herein by reference, should be consulted for additional background information. The image quality scale is based on just-noticeable-difference (JND) units of quality. In experiments, a JND is defined as the smallest image quality difference that can be detected by 50% of observers in forced-choice (no ties allowed) paired image comparisons. Stated another way, when two images are separated by exactly one JND, 50% of human observers will perceive the quality advantage of the better image and rate it best. The other 50% of the human observers will not perceive the difference, but will guess correctly half the time. Consequently, in a forced-choice comparison between two images that differ by exactly one JND, the higher quality image will be rated better 75% of the time. As the quality difference between image pairs becomes larger there will be nearly universal agreement as to which one is better; as a result, a scale covering a wide range of quality is composed of many JNDs. For example, when cast in subjective quality terms such as excellent, very good, good, fair, poor, etc., we have found that a difference of about 6 JNDs constitutes a full quality category.

While it is possible to set image quality switch-points for activating image defect location and correction processes at different absolute quality levels without departing from the spirit of the invention, the preferred embodiment employs a three JND (one-half quality category) criteria. This provides a reasonable balance between image quality enhancement and photofinishing throughput (images processed per unit of time). If the image quality switch-point is set at a lower JND value (e.g. one JND of degradation), the image defect location and correction processes will be invoked more frequently, which may lead to higher average image quality, but lower throughput due to extended image processing time. If the quality switch-point is set at a higher JND value (e.g. 6 JNDs of degradation), the image defect location and correction processes will be invoked less frequently, which may lead to lower average image quality, but higher throughput due to shortened image processing time.

In the detailed description of our preferred embodiments, image defect correction switch-points are defined that either activate or deactivate the image defect location and correction processes. It is to be understood that while this description pertains to correction processes that are applied in the same manner every time the quality loss due to an image defect is equal to or greater than the switch-point (e.g. 3 JNDs), the strength of the image defect correction processes can be altered in response to the degree of image quality loss predicted for the current scene.

For example, in the case of sharpness correction, as the predicted level of the image defect becomes worse the gain of the spatial filter applied in the sharpening operation can be increased. Similarly, in the case of noise defect correction, customized noise correction tables can be applied in response to the predicted magnitude of the image defect. In addition, the preferred embodiment of the present invention can be used to determine which image defect correction processes should be activated, and the strength of the corrections employed in those activated processes can be determined by analyzing the image pixel data using a series of pixel data predictors that correlate with the degree of the degradation caused by the defect. For example, the gradient of edges can be used to estimate the strength of the spatial filtering needed to correct sharpness defects.

As noted previously, the inventive process uses information collected at the time of image capture, which is referred to as meta data, to predict the presence of image defects in a photograph, and to subsequently decide when to apply image defect correction processes in digital photofinishing. A variety of meta data describing the scene and camera conditions used to capture the current image, can be recorded by the camera and transferred to photofinishing equipment, as is described in commonly assigned U.S. Pat. No. 5,229,810, which is incorporated herein by reference. In the case of cameras employing silver halide based films containing an integral magnetic layer, commonly referred to as Advanced Photo System (APS) films, the information recording device preferably comprises a magnetic recording head for magnetically encoding data on the surface of the film. Alternatively, in the case of film cameras without magnetic writing capability, latent image bar code data may be exposed outside the area of the primary image frame, and later decoded in the photofinishing equipment. In the case of DSCs, other known data recording techniques may also be utilized such as optical or magnetic recording on separable media such as disks or integrated circuit cards. In the detailed description of the embodiments that follows, it is understood that the method by which information is exchanged between the image capture device and the photofinishing equipment, while not specifically identified in each case, can be accomplished with any of the aforementioned well-known methods.

In FIG. 1, a general digital image processing system 10 useful in the practice of the invention is shown in which input pictorial image data and related image classification parameters are provided by means of one of a variety of indicated devices. The illustrated input devices include a photographic film scanner 12 which optically scans the image frames on a film strip and converts the scanned signals into digital image data. If the scanner is capable of reading APS film, then the scanner will typically read from the magnetic layer or optical bar code on the film, information encoded in the APS meta data information exchange (IX) and manufacturer data areas. Such meta data may include film type, camera settings, scene conditions, intended print format, and other data fields. Other possible image input devices include a digital file reader 14 which may contain data from a variety of sources, including digital cameras or a picture disk reader, a network input (e.g. modem) 16 which receives digital file data from a remote, central source, as in the case of Kodak Picture Network, or an order entry station input device 18 located at a retail store which scans a customers film, reads digital disks, and accepts order instructions, including print aspect ratio, size, zoom, crop and magnification instructions. This data is then input to an image processing computer 40 which may also include a display monitor 22 and a user data input device such as a keyboard 24. In the case of a home-based personal computer, for example, the key board may be used to input some of the scene, camera, and output size related data mentioned above. Included in the image processing functions of the computer 40, in accordance with the present invention is a process that makes use of camera, scene, and demographic factors to predict the presence of image defects in a photograph and subsequently to applies image defect correction means only when needed.

The output of the image processing computer 40 is applied to an appropriate output path for generation of hardcopy images. Representative output paths are illustrated and include a printer 26, such as a thermal dye printer or inkjet printer which are exemplary of printers useful for home computer use. Alternatively, the output path may comprise retail photofinisher equipment 28, such as a Noritsu 2711 Series Printer. Yet another exemplary output path comprises data communications device 30 which communicates with, for example, a remote commercial photofinishing laboratory 32 using a CRT or other photographic printer. Alternatively, the essential functions of image processing system 10, such as film scanning and conversion of scan data to digital image files, reading of digital camera image files, reading of information pertaining to camera, scene, and output parameters, and making use of camera, scene, and demographic data to predict the presence of image defects in a photograph, and subsequently applying image defect correction means only when needed, can be incorporated in an integrated apparatus such as a retail photofinisher unit.

Figure 7:
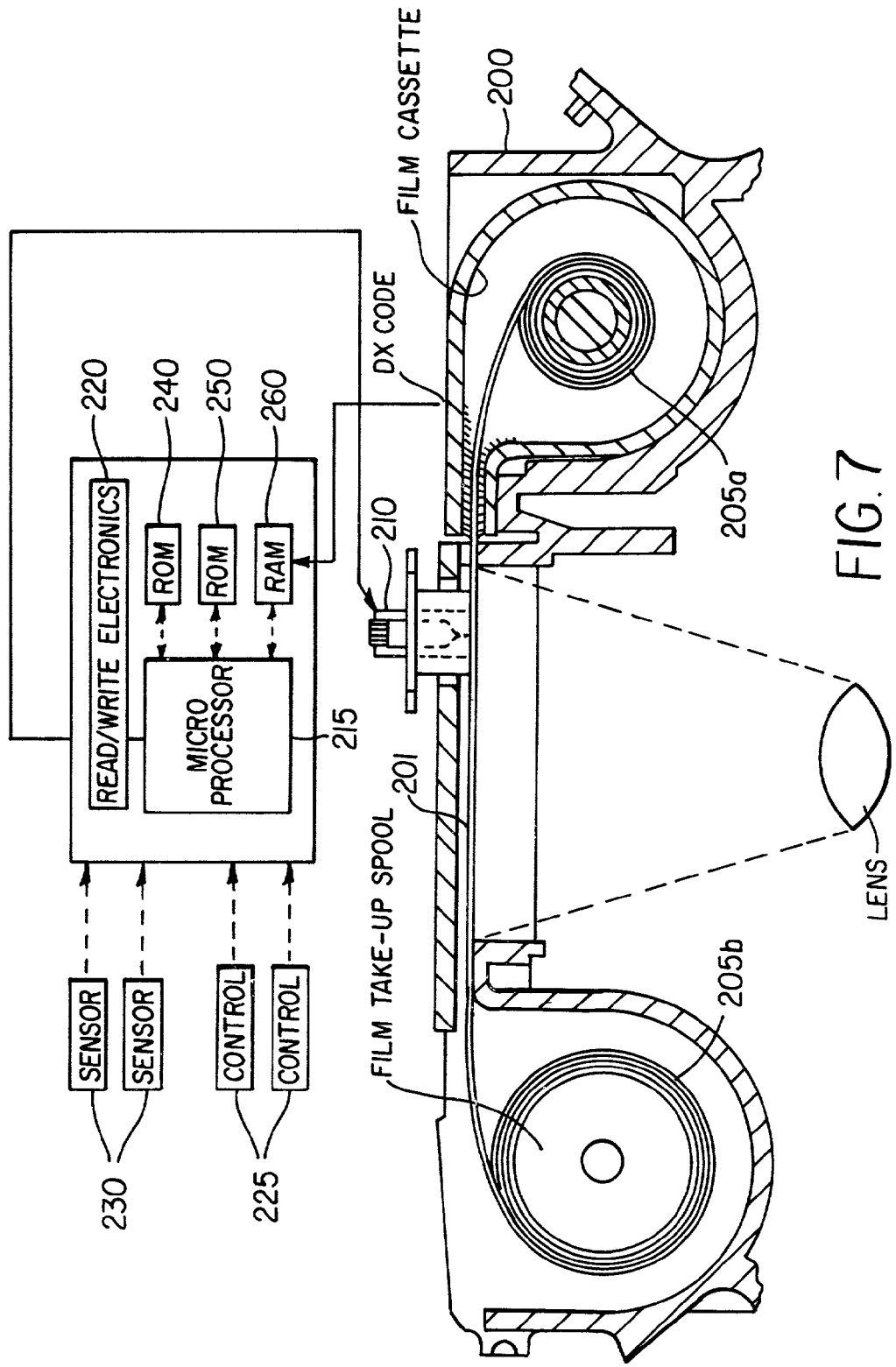
FIG. 7 is a diagram illustrating a film camera adapted to write meta data on a photographic film.

An important feature of the system shown in FIG. 1 is the collection of meta data at the time of image capture indicating, or capable of indicating, whether a defect is likely to be present in the final viewed image. In the preferred embodiments, this is accomplished with data collected by either a film camera or a digital camera, although some of the meta data (e.g., demographic data and display parameters) could be collected at the order entry station 18 or some other location subsequent (or prior) to the time of capture. In a typical film camera embodiment, as shown in FIG. 7, a film camera 200 transports a film strip 201 between the reels 205a,b of a film cartridge and a take-up sprocket respectively. The camera 200 includes a magnetic read/write head 210 facing a magnetic layer on the unsensitized side of the film strip 201. A microprocessor 215 controls magnetic data recording or playback by the head 210 through head electronics 220.

The microprocessor 215 may accept meta data to be magnetically recorded on the film strip 100 from the camera user or the camera mechanisms themselves through camera controls 225, such information pertaining, for example, to the desired display parameters, lens parameters (e.g., focal length, F-number, camera lens focus range), shutter speed, autofocus distance measurements of subject and background, backlight and flash fire state indicators, and the like, for ultimate use by the photofinisher. If a suitable input device is provided, for example a keypad, demographic data could be generated at this time. The microprocessor 215 may also accept scene related information from scene sensors 230 to be magnetically recorded on the film strip 100 for ultimate use by the photofinisher. Such information may include the ambient light level of the primary subject and background, and the like.

The advantage of the longitudinal dedicated track format is that magnetic recording of data on the film strip 201 may be performed by the camera using a relatively stationary head (i.e. the head 210) by buffering all of the data to be recorded in a particular frame in a particular camera track and then transmitting the data to the head just as the film is being wound to the next frame.

The microprocessor 215 includes a read only memory 240 containing instructions sufficient to ensure that each type of information received is recorded in the correct one of the dedicated camera tracks in accordance with a universal pre-arrangement common to both the camera and the photofinisher. (The aforementioned APS information exchange (IX) specifications illustrate dedicated camera tracks for meta data storage and information exchange. Section 10, "Writing and Reading Magnetic Information", and more specifically Section 10.4 "Data Dictionary", contain the relevant information.) For this purpose, the microprocessor sorts and buffers each piece of information in compliance with the instructions stored in the read only memory 240. The microprocessor also includes a ROM 250 with other camera-specific data, such as main flash and preflash guide number and camera to flash separation (if the flash is integral with the camera), lens-specific data (e.g., focal length and focus range, if the lens is integral with the camera), and the like, as well as a RAM 260 for storing film-specific information read from the film cassette, such as film ISO speed read from the DX coding on the film cassette. The meta data in the ROM 250 and the RAM 260 is then magnetically recorded on the film strip 100 for ultimate use by the photofinisher.

Figure 8:
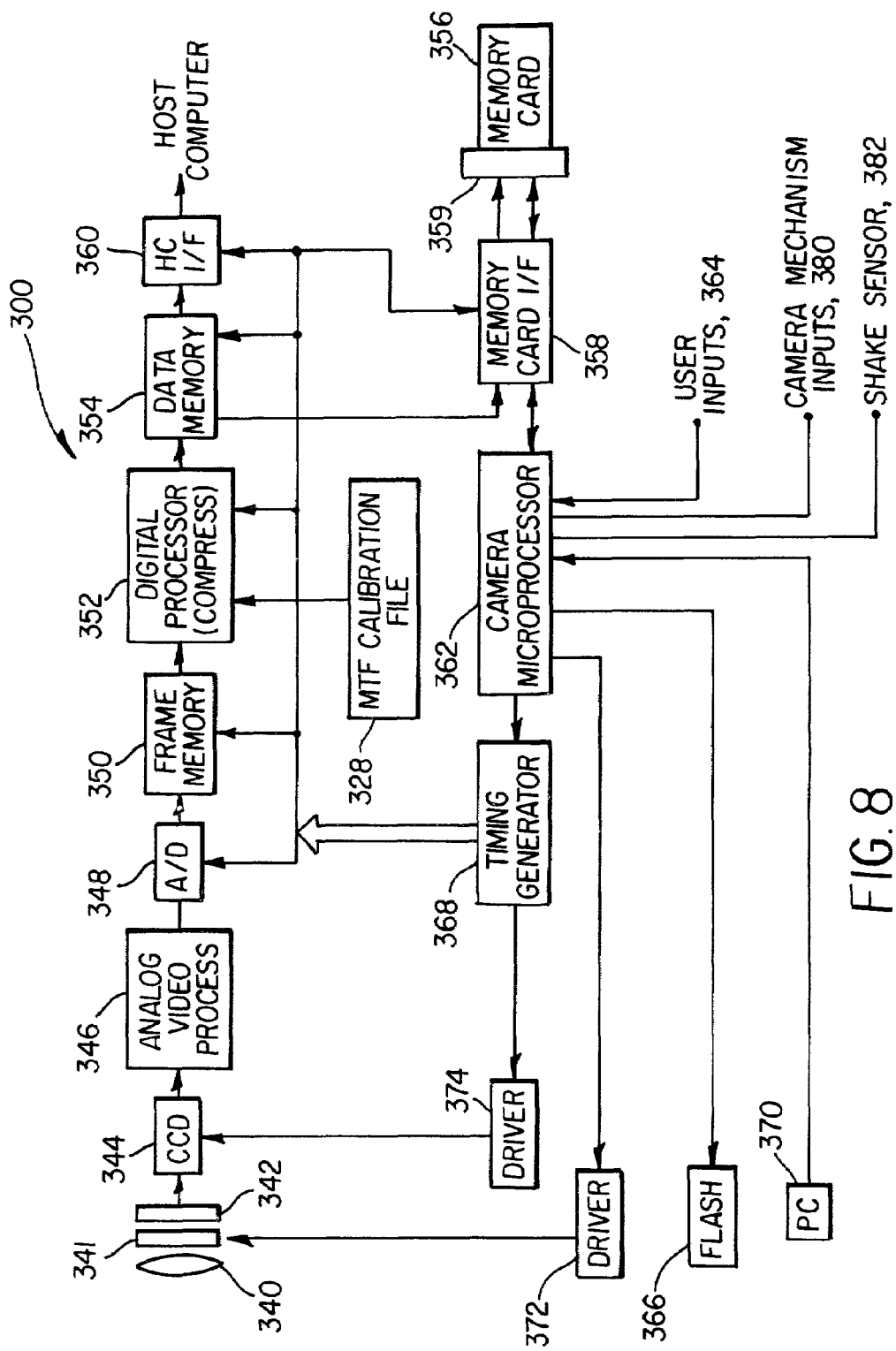
FIG. 8 is a diagram illustrating a digital camera adapted to write meta data on a digital record.

In a typical digital camera embodiment, such as shown in FIG. 8, a digital camera 300 includes a lens 340 that directs image light from a subject (not shown) through an aperture/shutter controller 341 and an anti-aliasing filter 342 upon an image sensor, which is typically a CCD or CMOS sensor 344. The sensor 344 generates an image signal that is processed by an analog video processor 346 before being converted into a digital image signal by an analog to digital (A/D) converter 348. The digitized image signal is temporarily stored in a frame memory 350, and then compressed by a digital signal processor 352. The compressed image signal is then stored in a data memory 354 or, if a memory card 356 is present in a memory card slot of the camera, transferred through a memory card interface 358 to the memory card 356. In this embodiment, the memory card is adapted to some appropriate interface standard, such as the PCMCIA card interface standard as described in the *PC Card Standard, Release* 2.0, published by the Personal Computer Memory Card International Association, Sunnyvale, Calif., September, 1991.

Electrical connection between the memory card 356 and the camera 300 is maintained through a card connector 359 positioned in the memory card slot. The card interface 358 and the card connector 359 provide, e.g., an interface according to the aforementioned PCMCIA card interface standard. The compressed image signal may also be sent to a host computer, which is connected to the camera 300 through a host computer interface 360. A camera microprocessor 362 receives user inputs 364, such as from a shutter release, and initiates a capture sequence by triggering a flash unit 366 (if needed) and signaling a timing generator 368. The timing generator 368 is connected generally to the elements of the camera 300, as shown in FIG. 8, for controlling the digital conversion, compression, and storage of the image signal. The microprocessor 362 also processes a signal from a scene sensor (photodiode) 370 for determining a proper exposure, and accordingly signals an exposure driver 372 for setting the aperture and shutter speed via the aperture/shutter controller 341. The CCD sensor 344 is then driven from the timing generator 368 via a sensor driver 374 to produce the image signal.

The microprocessor 362 may accept meta data to be recorded on the digital record from the camera user inputs 364 or from camera mechanism inputs 380, such information pertaining, for example, to the desired display parameters, lens parameters (e.g., focal length, F-number, camera lens focus range), shutter speed, autofocus distance measurements of subject and background, backlight and flash fire state indicators, and the like, for ultimate use by the photofinisher. The user inputs 364 can also include the resolution setting and gain factor of the camera (number of pixels in the captured image and the sensor-based ISO speed, if such is settable). If a suitable input device is provided, for example a keypad or a voice-actuated input, demographic data could be generated at this time by operator input of the information, although other techniques may be employed without limitation. The microprocessor 362 may also accept scene related information from the scene sensors 370 to be recorded on the digital record for ultimate use by the photofinisher. Such information may include the ambient light level of the primary subject and background, and the like. The microprocessor 362 may also accept camera shake data (measure of handheld stability of the camera) from a shake sensor 382.

Certain camera meta data may be contained in the camera PROM 328, which is connected to the digital signal processor 352. The camera PROM 328 includes camera-specific data, such as main flash and preflash guide number, camera to flash separation, sensor ISO speed, resolution setting, camera shake factor, and the like. Such camera-specific data may be variable (for example, if the flash unit is separable, movable, or otherwise adjustable) or invariant (for example, if the flash is non-movable and integral with the camera). Likewise, the sensor ISO speed may be the base ISO speed and the resolution setting may be the native setting, if this data is invariant. Different data structures may be used to transfer the meta data and the image data from the camera. For example, the digital signal processor 352 may write the meta data into a camera header, followed by individual image trailer records. In another data structure, the meta data is written into individual camera headers together with individual image trailer records. Alternatively, certain of the meta data, such as the camera-specific data stored in the PROM 328 may be contained in a computer file 330 (instead of, or in addition to being, in the PROM 328), which is provided as a floppy disk or the like in combination with the camera 300. This meta data is then accessed by the host computer through a conventional disk drive interface (not shown) when the user loads the disk into the interface. The meta data may also be embedded with the image data in a form of digital watermarking, e.g., as taught in U.S. Pat. No. 6,044,156, entitled "Method for Generating an Improved Carrier for Use in an Image Data Embedding Application", which is incorporated herein by reference.

It should be understood from the foregoing description of meta data creation in connection with film and digital cameras that other forms of meta data pertaining to camera, scene, demographic and display factors would be known to those of skill in this art, and are intended to be within the ambit of this invention. Likewise, other structures and mechanisms for the transfer of such meta data to subsequent utilization devices, such as digital photofinishers, would be clear to the skilled person and are intended to be within the scope of this invention. In addition, while the capture devices are described as film and digital cameras, it is possible that other capture devices such as a linear or area scanner could benefit from the invention, and to that extent are also included within the inventive concept.

In the case of the film or digital camera, the camera, scene or demographic factors can be directly recorded on the output medium, or the microprocessor 215 (film) or 362 (digital) may be employed to perform image processing upon the factors, for instance to determine if the current image will have a level of defect that if left untreated would reduce the perceived quality of the final viewed image. Consequently, in the latter case, the microprocessors 215 and 362 may perform some, or all, of the image processing performed by the digital image processor 40 shown in FIG. 1, that is, to predict the presence of image defects in a photograph and subsequently to enable image defect correction means only when needed.

Figure 2:
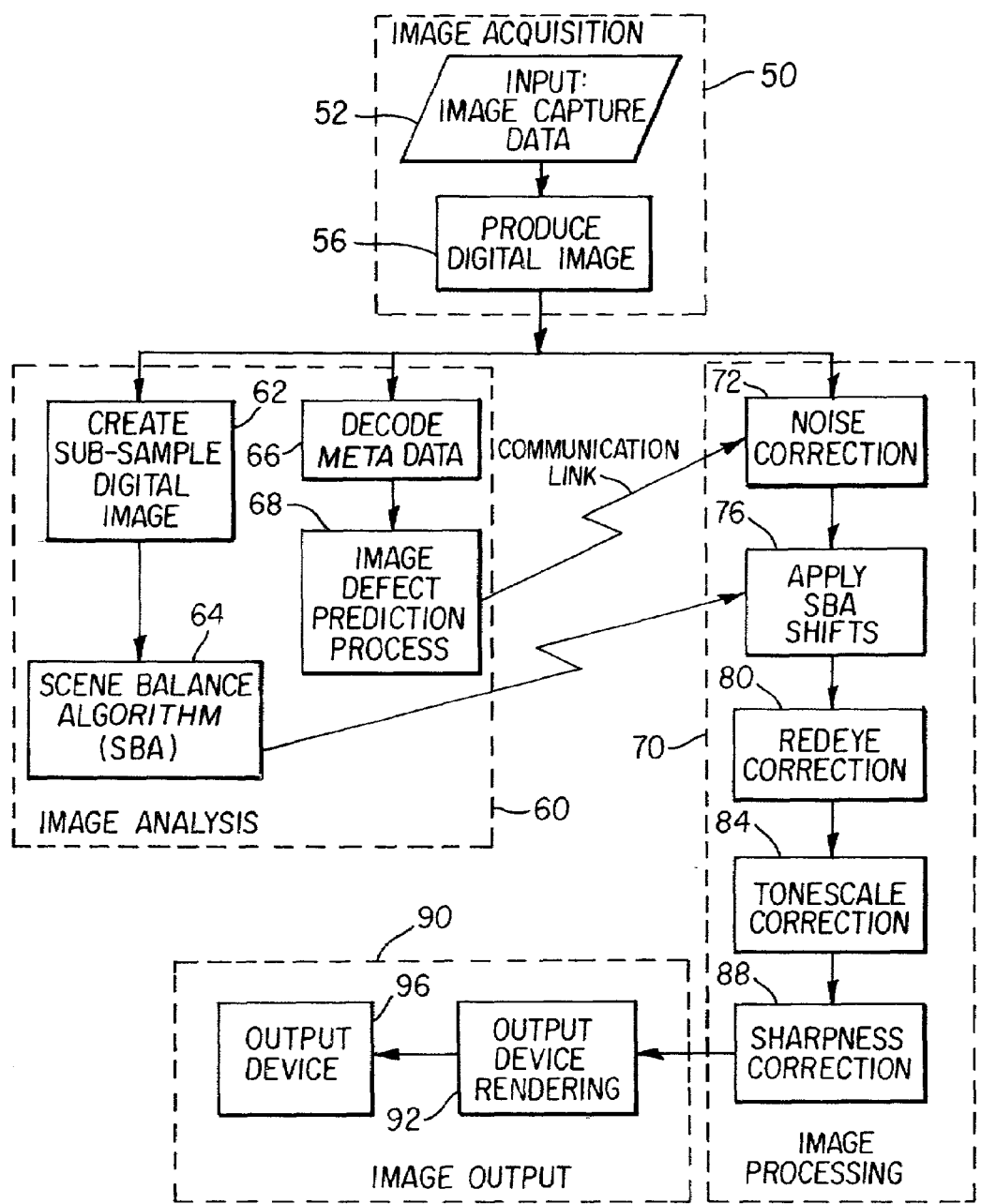
FIG. 2 is a functional block diagram of an image processing system illustrating the image analysis, image defect prediction, image processing (defect correction), and image output steps of the present invention.

The present invention can be implemented in computer hardware. For example, FIG. 2 represents a functional block diagram of a digital photofinishing system where the image acquisition block 50 includes image data and meta (e.g. APS IX) data from a capture device 52 such as the conventional photographic film camera 200 shown in FIG. 7 for recording a scene on color negative or reversal film, and a film scanner device for scanning the developed image on the film and producing a source digital image 56 and extracting the image meta data. Another example of an image capture device 52 is the digital camera 300 shown in FIG. 8 that has the ability to produce a source digital image 56 directly. The formed digital image file and associated meta data is transferred to the image analysis block 60, where the meta data decoder 66 extracts the information to be used in the image defect prediction process block 68. The primary purpose of the image defection correction process block 68 is to analyze available meta data pertaining to camera, scene, demographic, and image display factors, predict the presence of image defects in the final image display, and subsequently to activate only those correction processes in image processing block 70 that will improve the quality of the current image.

Prior to providing a detailed description of image defect prediction process block 68, the other functions of the image analysis 60, image processing 70, and image output 90 blocks will be described.

In the image analysis block, the full resolution digital image containing the red, green, and blue pixel data is subsampled in block 62 to create a smaller, for example 24×36 pixel, image that is analyzed by the scene balance algorithm 64. Scene balance algorithms use analog or digital processing to obtain the correct color balance and overall lightness for each image. The algorithms are commonly known as "white-balance," "color-constancy" or "scene-balance" algorithms. These algorithms can work on a single image, several images, or an entire set of images. An example of a suitable scene balance algorithms is described by E. Goll et al., "*Modern Exposure Determination for Customizing Photofinishing Printer Response*", Journal of Applied Photographic Engineering, 2, 93 (1979), which is incorporated herein by reference. Further improvements in scene-balance algorithms include setting a degree of illuminant chromatic correction using inferential illuminant detection, as disclosed in U.S. Pat. No. 6,133,983, which is incorporated herein by reference. Additional information on the film can help to characterize the variability of the chemical process that was used to develop the film. For example, as taught in U.S. Pat. No. 5,649,260, which is incorporated herein by reference, at least one or more gray reference patches with known exposure could have been exposed on the film during manufacturing, and then used to provide full-order film color balance calibration information to the scene balance algorithm.

The present invention may be practiced with any scene balance module such as the one described by Cok et al. in U.S. Pat. No. 4,945,406, which is incorporated herein by reference. The scene balance module calculates the pixel values of a theoretical 20% gray card corresponding to the exposure of the scene digital image. A look-up-table is calculated and applied to the scene state digital image, which results in a balanced digital image. Although no scene balance module performs perfectly at the task of compensating the digital image for variations in exposure and illumination color effects, the scene balance module does improve the accuracy of the color representation of the digital image. Because the scene balance algorithm is needed for nearly all images, due to imperfections in image capture exposure and/or illuminant color balance, and the scene balance algorithm is computationally efficient, due to the use of a smaller subsampled image, it is applied to every image in the preferred embodiment of the present invention.

However, in accordance with the invention, and as noted earlier, the remaining image processing steps, which are located in the image processing block 70, are selectively applied based on the output of the image defect prediction process 68. For this purpose, the digital image produced in block 56 is provided in separate chrominance and luminance channels, as needed, for the subsequent image processing steps.

If activated by the image defect prediction process 68, the noise correction process 72 is applied prior to the scene balance shift 76 to make use of the unbalanced color channel specific exposure information of the capture. The Sigma filter, described by Jong-Sen Lee in the aforementioned journal article *Digital Image Smoothing and the Sigma Filter*, which is incorporated herein by reference, is a noise reduction algorithm to enhance the visual appearance of the processed digital image. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold, the weighting factor is set to one. Otherwise, the weighting factor is set to zero. The numerical constant $\epsilon$ is set to two times the expected noise standard deviation. Mathematically the expression for the calculation of the noise reduced pixel value is given as:

$$q_{mn} = \Sigma_{ij} a_{ij} p_{ij} / \Sigma_{ij} a_{ij} \qquad \text{EQ. 1}$$

and $$a_{ij} = 1 \text{ if } |p_{ij} - p_{mn}| \leq \epsilon$$

$$a_{ij} = 0 \text{ if } |p_{ij} - p_{mn}| > \epsilon$$

where $p_{ij}$ represents the $ij^{th}$ pixel contained in the sampled local region, $p_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by:

$$\epsilon = \text{Sfac } \sigma_n(p_{mn}) \qquad \text{EQ. 2}$$

where $\sigma_n$ represents the noise standard deviation of the source image evaluated at the center pixel value $p_{mn}$. The parameter Sfac is termed a scale factor can be used to vary the degree of noise reduction. The calculation of the noise reduced pixel value $q_{mn}$ as the division of the two sums is then calculated. The process is completed for some or all of the pixels contained in the digital image channel and for some or all the digital image channels contained in the digital image. The noise reduced pixel values constitute the noise reduced digital image.

A median filter may also be used as a noise reduction algorithm to reduce the noise present in a digital image. The noise reduced pixel value produced with a median filter is typically derived by calculating the statistical mean of values taken from a sampling region centered about the pixel of interest. Typically an n by n square window size is chosen where n denotes the length of pixels in either the row or column direction. The degree of noise reduction is controlled by the size of the window. Larger window sizes result in more noise removed from the digital image.

If activated by the image defect prediction process 68, the redeye correction process 80 locates and removes eye color defects. The present invention may be practiced with a variety of methods which locate and correct redeye defects. One suitable method is disclosed by Benati et al. in U.S. Pat. No. 5,748,764, which issued May 5, 1998 and which is incorporated herein by reference. This method locates redeye defects in an image and provides separate corrections for body, border, and glint pixels in the pupil of the affected eye. The redeye defect detection process involves defining a spatial region within the digital image in which one or more eye color defects may exist, which includes at least a portion of the subject's head; sampling the color content of the pixels within the spatial region and comparing the sampled pixels with threshold values indicative of redeye defect pixels; segmenting the potentially defective pixels into contiguous groups; calculating a first score for each pixel of each group based on a plurality of features including group size, group shape, coloration, and brightness to identify redeye defect candidates; selecting a seed pixel based on its score from each identified eye color defect group candidate and determining all of the neighboring pixels which are within a predetermined score range of their neighboring pixels and those pixels which represent a significant pixel score transition indicative of the outer boundary of the redeye defect. Each of the three redeye defect pixel types (body, border, glint) is rendered differently to remove the defect and create a natural appearing correction.

An alternative embodiment of the present invention employs a method of applying a redeye defect location and correction process disclosed by Schildkraut et al. in commonly-assigned U.S. Pat. No. 6,292,574 issued Sep. 18, 2001, entitled *A Computer Program Product for Redeye Detection*. This process is advantageously used in conjunction with the method disclosed in commonly-assigned U.S. Pat. No. 6,151,403 issued Nov. 21, 2000 entitled *Method for Automatic Detection of Human Eyes in Digital Images* by Jiebo Luo. Both patents are incorporated herein by reference.

Many natural scenes photographed under ambient lighting conditions result in photographic images which have a luminance dynamic range that far exceeds the dynamic range of conventional display systems. For example, photographic images taken in sunny outdoor conditions can have 10 or more photographic stops of recorded information while photographic paper can reproduce approximately seven photographic stops of information. In addition, as noted above, electronic flash illumination, by virtue of the distance-induced exposure difference between the main subject and background, can also produce dynamic range that exceeds the capacity of the chosen display. In digital imaging systems scene dependent tone scale function algorithms may be employed to reduce the dynamic range of the source digital image thus providing a better match of the processed digital image to the dynamic range capabilities of the output medium.

If a high dynamic range scene is anticipated by the image defect prediction process 68, the scene dependent tonescale correction process 84 is employed. The tone scale correction process 84 uses the pixels in the balanced digital image to calculate a tone scale function, i.e., a single valued mathematical equation or transformation that has a single output value corresponding to each input value. The present invention implements the tone scale function as a look-up-table for computation efficiency. The result of the application of the tone scale processing produces a tone scale adjusted digital image such that the tone scale, or brightness and contrast, of the digital image is enhanced without modification of the color content.

The present invention may be practiced with a variety of methods that generate tone scale functions. The preferred embodiment of the present invention uses the methods disclosed in U.S. Pat. Nos. 4,731,671 and 5,822,453, which are both incorporated herein by reference. These methods are employed by the present invention to produce two individual tone scale functions. These two tone scale functions are then cascaded into single tone scale function which is used to adjust the brightness and contrast of the balanced digital image.

In U.S. Pat. No. 5,822,453, Lee and Kwon disclose a method of calculating a tone scale function using the pixel values of a digital image, and involving the estimation of the scene contrast from the digital image. The method taught by Lee and Kwon involves calculating a Laplacian filtered version of the digital image, forming a histogram of the Laplacian signal; determining from the Laplacian histogram two threshold values which when applied to the Laplacian signal substantially eliminate uniform areas; sampling pixels from the digital image which are based on the thresholds; forming a histogram from the sampled pixels; computing a standard deviation of the sampled histogram; and estimating contrast of the digital image by comparing the computed standard deviation with a predetermined contrast for determining contrast of the input image in relationship with the predetermined contrast. The method described by Lee and Kwon is used to calculate a first tone scale function.

In U.S. Pat. No. 4,731,671, Alkofer discloses a method of calculating a tone scale function using the pixel values of a digital image based on normalizing the histogram of a digital image. This method involves determining the contrast of the digital image by calculating the standard deviation of a sample of pixel values. The second tone scale function is calculated by normalizing a histogram of the sample of pixel values. The sample of pixel values is selected from one of a plurality of samples of pixel values corresponding to a plurality of contrast intervals based upon the shape of the histogram of the selected sample of pixel values. To facilitate the adjustment of contrast, the tone scale function is constructed to produce values in units of a standard normal variate Z. These Z values are then multiplied by a constant, which is a function of the standard deviation of the sample of pixel values to determine the contrast of the processed digital image.

The first and second tone scale functions are combined into a final tone scale function using the mathematical formula:

$$LUT_f = LUT_1[LUT_2[j]] \qquad \text{EQ. 3}$$

where $LUT_2$ represents the second tone scale function, $LUT_1$ represents the first tone scale function, and $LUT_f$ represents the final tone scale function. The j variable represent the index of pixel values of the digital image to be processed. The final tone scale function $LUT_f$ is calculated by evaluating the expression of equation 3 for the range of possible pixel values.

The final tone scale function $LUT_f$ and the balanced digital image is received by the tone scale correction block 84. The present invention applies the final tone scale function to the luminance digital image channel of the balanced digital image to adjust the brightness and contrast attributes of the digital image. The preferred embodiment of the present invention applies the final tone scale function, in the form of a look-up-table, directly to the pixels of the luminance digital image channel of the balanced digital image. This method is preferred primarily for its computational efficiency properties.

An alternative embodiment of the present invention employs a method of applying a tone scale function disclosed by Lee et al. in U.S. Pat. No. 5,012,333, which is incorporated herein by reference, for improved image quality results. Although Lee et al. describe a method for interactively modifying image attributes, the present invention employs the method of applying tone scale functions to digital images based on spatial filtering techniques. This method involves spatially filtering the luminance digital image channel resulting in two spatial frequency components (high and low frequency components), applying the tone scale function to the low spatial frequency component, and combining the tone scale modified low spatial frequency component with the high spatial frequency component. This approach, employing frequency separable tone scale manipulation and sharpening, is superior to methods such as those disclosed in U.S. Pat. No. 5,739,924, which involve emphasizing the outline and the contrast of the subject based on subject brightness, and subject distance.

In the preferred embodiment of the present invention, if a scene with sharpness problems is anticipated by the image defect prediction process 68, the sharpness correction process 88 is employed. The sharpness correction block 88 receives the tone scale adjusted digital image from the tone scale module 84 and applies a spatial filter to the tone scale adjusted digital image to adjust spatial modulation content. The present invention may be practiced with a variety of different spatial filters; however, a key aspect of the present invention relies on the combination of the method of manipulation of the color, tone and spatial detail attributes of a digital image. An example of a spatial filter that may be used is described by Kwon et al. in U.S. Pat. No. 5,398,077, which is incorporated herein by reference. Kwon et al teach a method of spatially processing a digital image involving transforming a red-green-blue image into a luminance chrominance domain and applying an adaptive filter to the luminance channel. The adaptive filter employs a method of calculating a statistical measure of local spatial activity and varying the sharpness of the image detail structure based on the statistical measure. The result of the application of the spatial filter produces a tone scale adjusted digital image with modified values such that the spatial detail of the digital image is enhanced without modification of the color content.

The image output block 90 receives the modified digital image from the sharpness correction block 88. The digital image processing steps conducted within the output device rendering block 92 involve transforming the pixel values of the modified digital image into a corresponding set of device code values to account for the color manipulation characteristics of the output device and media. The transformation between device code values and the colorimetry of the colors reproduced by a particular device/media combination can be obtained by a device characterization. An example of a device characterization is a procedure that involves generating and printing or displaying a suitable array of device code values in the form of color patches of a size large enough for subsequent measurement. These patches can be measured using a calorimeter, a spectrophotometer or a telespectroradiometer, depending on the nature of the display. If spectra are measured, CIE XYZ values and other related quantities such as CIELAB or CIELUV values can be calculated for the display illuminant using standard calorimetric procedures. This data set can be used to construct the appropriate sequence of one-dimensional look-up tables, multidimensional look-up tables, matrices, polynomials and scalars that accomplishes that transformation of the digital representation of the scene resulting from the combined processing operations performed in the output device rendering block 92 into a set of device code values that produces this desired visual representation of the scene. Another example of the implementation of this transformation is an ICC profile that maps the specifications of the desired visual reproduction, encoded in profile connection space (PCS), to device code values.

This operation may also include gamut mapping. The color gamut characteristics of the modified digital image are determined by the set of primaries that was used for encoding the data. Examples include the primaries corresponding to the color-matching functions of the CIE 1931 Standard Colorimetric Observer or any linear combinations thereof. Gamut mapping is performed between the gamut defined by this encoding and the gamut of the output device/media combination. The preferred gamut mapping algorithms used in combination with this invention are those that maintain hue.

From an imaging processing point of view, the data transformation performed by the output device rendering block 92, whether dedicated to neutral balance or color gamut functions can be combined to form a single set of one-dimensional look-up tables, multidimensional look-up tables, matrices, polynomials and scalars in any sequence. Reproductions according to the specifications of this invention can be produced by a variety of technologies. Reproductions can be obtained on silver halide or other light-sensitive materials.

The light-sensitive material, as used by an image output device 96, may be transparent film, reflective paper, or semi-transparent film. These materials are exposed by visible or infrared light derived from many different sources. The materials may be designed for typical photofinishing applications or they may be specially designed for digital printing applications. The photo-sensitive materials respond primarily to three different spectral regions of incident light. Typically, these are red (600–720 nm), green (500–600 nm), and blue (400–500 nm) light. However, any combination of three different spectral sensitivities can be used. These could include green, red, and infrared light or red, infrared 1, and infrared 2 light, or 3 infrared lights of different wavelengths. Or a material sensitive to the three primary wavelengths of visible light may be false sensitized so that the color of the exposing light does not produce image dye of the complementary hue, such as red, green, and blue sensitivity producing magenta, yellow, and cyan dye, respectively. Printing can be effected by exposing all pixels sequentially, by exposing a small array of pixels at the same time, or by exposing all the pixels in the image at the same time.

Devices which can be used to print on light-sensitive materials include CRT, LED (Light Emitting Diode), LVT (Light Valve Technology), LCD, Laser, as well as any other controlled optical light generating device. All these devices have the ability to expose 3 or more light-sensitive layers in a light-sensitive material to produce a colored image. They differ mainly in the technology on which the devices are based. A suitable embodiment of a CRT printer is the Kodak Digital Science LF CRT Color Printer which can be used in combination with Kodak Professional Digital III Color Paper.

Non-light-sensitive imaging materials are conveniently used by electronic printing processes to produce high-quality reproductions. The printing process can be based on many technologies. The method of image formation can be half-tone, continuous tone, or complete material transfer. The imaging material can be transparent film, reflective paper, or semi-transparent film. The materials can be written on to produce pictorial images by thermal dye transfer, ink jet, wax, electrophotographic, or other pixelwise writing techniques. These processes use three or more colorants to create colored pictorial representations of pictorial scenes. The colorants may be dyes, toner, inks, or any other permanent or semi-permanent colored material. A suitable embodiment of a thermal printer is the Kodak XLS 8650 thermal dye transfer printer.

In addition to hardcopy viewed images, it is also possible with the current invention to efficiently create projected images. Many technologies are appropriate for this kind of image generation. All these techniques rely on producing color images with two or more colored lights. These are typically red, green, and blue in nature although they can be any set of primaries. Devices which can be used to create the preferred viewed reproduction include CRT, LCD, EL (Electro-Luminescence), LED, OLED (organic LEDs), light bulbs, lasers, plasma display panels, or any other three or more colored lighting apparatus capable of pixelwise illumination. The images can be created by display within the device, projection, or backlighting. Many devices create an image on a screen or display area which is physically a part of the mechanical unit. However, images can also be created by optically projecting the image in the form of light rays from behind or in front of the viewer toward a screen which is in front of a viewer or by projecting a reversed image toward the viewer onto a screen between the viewer and the projecting device. A suitable embodiment of a CRT display is a Sony Trinitron CRT.

This concludes the detailed description of the functions of the image analysis 60, image processing 70, and image output 90 blocks. A detailed description of the image defect prediction process block 68, that controls the state (active or inactive) of each of the previously detailed image defect correction processes in the image processing block 70, will now be provided.

After the meta data associated with the current image is decoded in block 66, a number of intermediate parameters are calculated in the image defect prediction block 68 from the decoded data and subsequently used in the Noise Defect Prediction Block 100 shown in FIG. 3, the Redeye Defect Prediction Block 120 shown in FIG. 4, the Tonescale Defect Prediction Block 140 shown in FIG. 5, and the Sharpness Defect Prediction Block 160 shown in FIG. 6. Other parameters such as Flash Fire State (on/oft) can be used directly, and still other parameters may require units conversion; for example, ambient light level, which is converted from camera BV (brightness value) to luminance units in foot lamberts. The intermediate parameter values, calculated from decoded meta data, and used in multiple defect prediction blocks, are calculated once and shared among the defect prediction blocks 100,120,140,160. However, for purposes of illustrating the functionality of each of the defect prediction blocks, the processing steps (104,124,144, 164) that follow the meta data input block show the creation of each of the intermediate parameters.

This section defines the meta data items and shows the manner in which the intermediate parameters are calculated from the meta data items in the preferred embodiment. Those skilled in the art will understand that the units of distance, exposure, flash output, system magnification, and image defect level can be recast without departing from the intent of the teachings of the present invention. In the preferred embodiment the following meta data items, or a subset thereof, collected by camera sensors and/or manual photographer input are employed in the image defect prediction blocks (100,120,140,160):

General Parameters:

Subject Demographic Data includes: subject race and age

User-Specified or Camera-Measured Parameters:

BL: Camera Backlight Indicator State (on/off;on=high contrast scene)

CSF: Camera Shake Factor (measure of handheld stability of camera)

D: Diagonal Dimension of the Final Display (inches)

DG: DSC Gain Factor (multiple of sensor base ISO speed)

DR: DSC Resolution Setting (number of pixels in captured image)

Ds: Camera-to-Subject Distance (feet)

Db: Camera-to-Background Distance (feet)

f: Camera Lens F-number

FL: Camera Lens Focal Length (inches)

FF: Flash Fire State (on/off)

FLS: Flash-to-Camera Lens Separation (center-to-center, inches)

GNm: Main Flash Output (Guide Number, Current ISO, feet)

GNp: Preflash Output (Guide Number, Current ISO, feet)

K: ANSI Lens Exposure Constant (default=3.91)

LFR: Camera Lens Focus Range (inside or outside of range)

LS: Linear Smear (in mm at capture plane during exposure)

LLs: Ambient Light Level of Primary Subject (camera light meter reading in foot lamberts)

LLb: Ambient Light Level of Background (camera light meter reading in foot lamberts)

Mc: Current Reproduction (e.g. printing) Magnification

Ms: Standard Reproduction (e.g. printing) Magnification

Mn: Non-Standard (e.g. enlargement) Magnification

S: Film or DSC Sensor ISO Speed

T: Camera Shutter Speed (seconds)

Intermediate Parameters:

In the preferred embodiment, a number of intermediate parameters are calculated from the meta data listed above and employed in the image defect prediction blocks (100, 120,140,160).

The intermediate parameters quantifying the degree of exposure of the main subject and the background, which have been found to be useful in the noise defect prediction 100 and tonescale defect prediction 140 blocks, are calculated as follows:

Es: Exposure on Subject ($\log_{10}$ E Units)

$$Esf \text{ for flash illumination} = \log_{10}[(GNm/Ds)/f]^2 \qquad \text{EQ. 4}$$

$$Esa \text{ for ambient illumination} = \log_{10}[LLs/LLn] \qquad \text{EQ. 5}$$

Where LLn (EQ. 6) is defined as the light level (foot lamberts) where an ISO normal exposure occurs with the current camera settings, and is found with the following equation, set forth in the ISO/ANSI standard for general-purpose photographic exposure meters ANSI 3.49-1987.

$$LLn = (K)(f^2)/(S)(T) \qquad \text{EQ. 6}$$

FLASH ILLUMINATION EXAMPLE

Let Camera Main Flash GN=48 for ISO 200 Film
Ds (subject distance)=6 feet
f (lens f-number)=5.6
Esf=$\log_{10}[(48/6)/5.6]^2$=0.30 log E (one-stop over exposed)

AMBIENT (NATURAL) ILLUMINATION EXAMPLE

Let LLs (Light Level of Subject)=4 Foot Lamberts
K=3.91
f (lens f-number)=4
S (ISO film speed)=400
T (shutter time, seconds)=0.01
LLn=$[(3.91)(4^2)]/[(400)(0.01)]$=16 foot lamberts
Esa=log10(4/16)=−0.6 log E (two-stops under exposed)

The flash and ambient exposures for the background are calculated in the same fashion, but in this case the measured camera-to-background distance data and background illuminance levels are used in the equations.

Eb: Exposure on Background($\log_{10}$E Units)

$$Ebf \text{ for flash illumination} = \log_{10}[(GNm/Db)/f] \quad \text{EQ. 7}$$

$$Eba \text{ for ambient illumination} = \log_{10}[LLb/LLn] \quad \text{EQ. 8}$$

Where LLn (EQ. 6) is defined as the light level (foot lamberts), in this case for the background portion of the scene, where an ISO normal exposure occurs with the current camera settings.

The intermediate parameters, hereafter identified as FER (Flash Exposure Ratio) and AER (Ambient Exposure Ratio), which quantify the ratio between the exposure on the main subject and the background, and have been found to be useful in the Tonescale Defect Prediction Block 140, are calculated as follows:

FER: Flash Exposure Ratio $$FER = 10^{|Esf-Ebf|} \quad \text{EQ. 9}$$

AER: Ambient Exposure Ratio $$AER = 10^{|Esa-Eba|} \quad \text{EQ. 10}$$

The absolute value signs are needed in the exponent term of EQ. 9 and EQ. 10 to reflect the fact that the magnitude of the exposure ratio, whether the subject or background is receiving the dominant exposure, is the key parameter.

The intermediate parameters quantifying the format and subject reproduction magnifications as perceived in the final display, which have been found to be useful in the Noise Defect Prediction Block 100, the Redeye Defect Prediction Block 120, and the Sharpness Defect Prediction Block 160, are calculated as follows:

AM: Angular Magnification of Subject

In the Sharpness Defect Prediction Block 160, at decision point 172, the AM parameter has been found to be a useful predictor for determining the maximum handheld shutter time required to minimize hand-tremor-induced blur for the average photographer. And in the Redeye Defect Prediction Block 120, at decision point 130, the AM is a useful predictor in that it correlates with the size of the subject's eyes, and therefore contributes to the perceived severity of the redeye image defect.

$$AM = [(FL)(Mc)]/Vd \quad \text{EQ. 11}$$

Where:

Vd: Final Image Viewing Distance (Specified in Inches)

As disclosed in columns 43–44 of U.S. Pat. No. 5,323,204, which issued Jun. 21, 1994 to the present assignee and which is incorporated herein by reference, and contrary to conventional wisdom, human observers do not view photographs at distances that are linearly related to the display size. In this regard, empirical-based perceptual measurements of eye-to-display separation suggest that the average viewing distance (Vd) for handheld prints of varying sizes can be characterized as follows:

$$Vd = 3.64 + 11.34[\log_{10}(D)] \quad \text{EQ. 12}$$

Where:
D=the diagonal dimension of the final display (specified in inches)

Viewing Distance Examples
Vd for 4 by 6 inch print=$3.64+11.34[\log_{10}(7.2)]$=13.4 inches
Vd for 8 by 12 inch print=$3.64+11.34[\log_{10}(14.4)]$=16.8 inches MST: Maximum Handheld Shutter Time (Seconds)

The maximum handheld shutter time is an intermediate parameter that specifies for the current camera lens focal length, reproduction magnification, and final image viewing distance, the longest handheld shutter time that can be employed by a person with average hand tremor without causing noticeable blur to be perceived in the final image. The MST is affected by the camera shake factor (CSF), which specifies the stability of the camera. The CSF is one of the items that may be included in the general camera meta data. If the CSF is not available, the default value of unity, appropriate for typical 35 mm point-and-shoot cameras is used. We have found that interchangeable lens (SLR) cameras are more stable and typically have CSF values of about 1.4.

$$MST = [(0.169)(Vd)(CSF)]/[(FL)(25.4)(Mc)] \quad \text{EQ. 13}$$

Where: the constant 0.169 is needed to fit the experimental data such that the result of the MST equation is the longest exposure time that will not produce significant image blur. The value of this constant was derived by rating the quality of images shot by a representative population of photographers, where the exposure times were systematically varied. The constant 25.4 converts the camera lens focal length from inches to mm.

Maximum Handheld Shutter Time Examples 35-mm Format SLR Camera, 35 mm Lens, 4×6 Inch Print:
FL=1.38 inch
Mc=4.44
Vd=13.36 inch
CSF=1.4
MST=$[(0.169)(13.36)(1.4)]/[(1.38)(25.4)(4.44)]$=0.02 second APS Point-and-shoot Camera, 25 mm Lens, 4×10 Inch Panoramic Print:
FL=0.98 inch
Mc=10.6
Vd=15.35 inch
CSF=1.0

MST=[(0.169)(15.35)(1.0)]/[(0.98)(25.4)(10.6)]=0.01 second

These examples show that a shorter exposure time is needed to maintain an acceptable level of hand-tremor-induced blur with higher reproduction magnification and less stable (lower CSF) cameras.

DSF: Display Size Factor

The present authors disclose the Display Size Factor (DSF) in columns 44–45 of the aforementioned U.S. Pat. No. 5,323,204, which quantitatively accommodates the independent selection of display size and reproduction magnification. The DSF was conceived in order to account for the differences between full-frame reproductions and cropped image reproductions where the final display size is not the product of the capture media format size and the reproduction magnification. This occurs when pseudo-panoramic or pseudo-telephoto (electronic zoom) features, which are popular on APS and DSC cameras, are selected by the photographer and/or when a device such as a Kodak Picture Maker is used to selectively zoom and crop a portion of a full-frame image to create a new composition. DSF has been found to be advantageous when predicting the severity of defects that vary in response to the reproduction and viewing magnifications, rather than the subject reproduction magnification, as was the case with the AM parameter. For example, the DSF parameter is used in the Noise Defect Prediction Block 100 to create lookup tables for decision point 106, and in the Sharpness Defect Prediction Block 160 at decision point 166.

These are cases where the perceived quality loss due to the image defect is correlated with the degree to which the structure of the image is magnified.

$$DSF=(Ms/Mn)(Vdn/Vds) \qquad \text{EQ. 14}$$

Where:

Vds is the viewing distance for the standard display size
Vdn is the viewing distance for the non-standard display size Display Size Factor Examples 35-mm Format Camera, 4×6 Inch Full-frame Print:
Ms=4.44
Mn=4.44
Vds=13.4 inches
Vdn=13.4 inches
DSF=(4.44)/(4.44)(13.4/13.4)=1.0

35-mm Format Camera, 8×12 Inch Full-frame Print:
Ms=4.44
Mn=8.88
Vds=13.4 inches
Vdn=16.8 inches
DSF=(4.44/8.88)(16.8/13.4)=0.63

35-mm Format Camera, 2× Electronic Zoom (EZ) 4×6 Inch Print:
Ms=4.44
Mn=8.88
Vds=13.4 inches
Vdn =13.4 inches
DSF=(4.44/8.88)(13.4/13.4)=0.5

These examples show that the DSF decreases when the reproduction magnification increases and the viewing distance decreases. For example, the full-frame 8×12 inch case and the 2×EZ 4×6 inch print case have the same reproduction magnification (Mn), but the 2×EZ case produces a smaller print and therefore a closer viewing distance that leads to a smaller DSF, which correlates with lower perceived image quality.

As outlined in the Background section, each of the image defects included in the inventive process was studied to determine the relationship between the amount of defect present and the perceived image quality loss. The image quality loss data was correlated with scene, camera, demographic, and display parameters to develop the predictors employed in Image Defect Prediction Blocks 100,120,140 and 160, which were found to be useful in determining when to activate the digital image defect correction processes contained in Blocks 72,80,84 and 88. The empirical studies leading to the development of the predictors involved the generation of images of a variety of scene types containing camera, illumination, display, and subject characteristics spanning the range encountered in consumer photography. By varying the imaging system and scene characteristics in this fashion, a population of images containing a wide range of image defects was produced. These images were visually rated for quality using the perceptually uniform JND scale previously described, and their associated capture and display characteristics were analyzed to develop the final parameters suitable for predicting the probability and severity of image defects.

SP: Switch Point (On/Off) Values for Decision Points

From this perceptually-derived image quality data, the predictor values, hereafter denoted as switch-point (SP) values, are selected for each decision point parameter 106, 128,130,132,148,152,166,170,172,174 that correspond with 3 JNDs of image quality loss. As discussed at the beginning of this section, the 3 JND value, which corresponds with about one-half of a subjective image quality category, was selected for the preferred embodiment because it provides a good balance between image processing efficiency (number of images processed per unit time) and image quality improvement. The SP values in the table should cover the range of conditions encountered in consumer photography. If a general or intermediate parameter falling outside of the current SP values in the decision tables is encountered, the table value closest to the current parameter is applied in the decision process. If a general or intermediate parameter falling between the current SP values in the decision tables is encountered, intermediate values may be obtained by well-known interpolation techniques.

A detailed description of the processes contained in Image Defect Prediction Blocks 100,120,140 and 160 will now be provided. To illustrate the functionality of the Image Defect Prediction Blocks in the preferred embodiments of the present invention, SP parameter values for traditional film (e.g. AgX-based media) will be shown. However, it should be appreciated that the inventive image defect prediction processes are equally applicable to other capture media, whether based on chemical or electronic capture technologies. In the description that follows, the points in the process where specific parameter values vary depending on the image capture modality will be highlighted.

Figure 3:
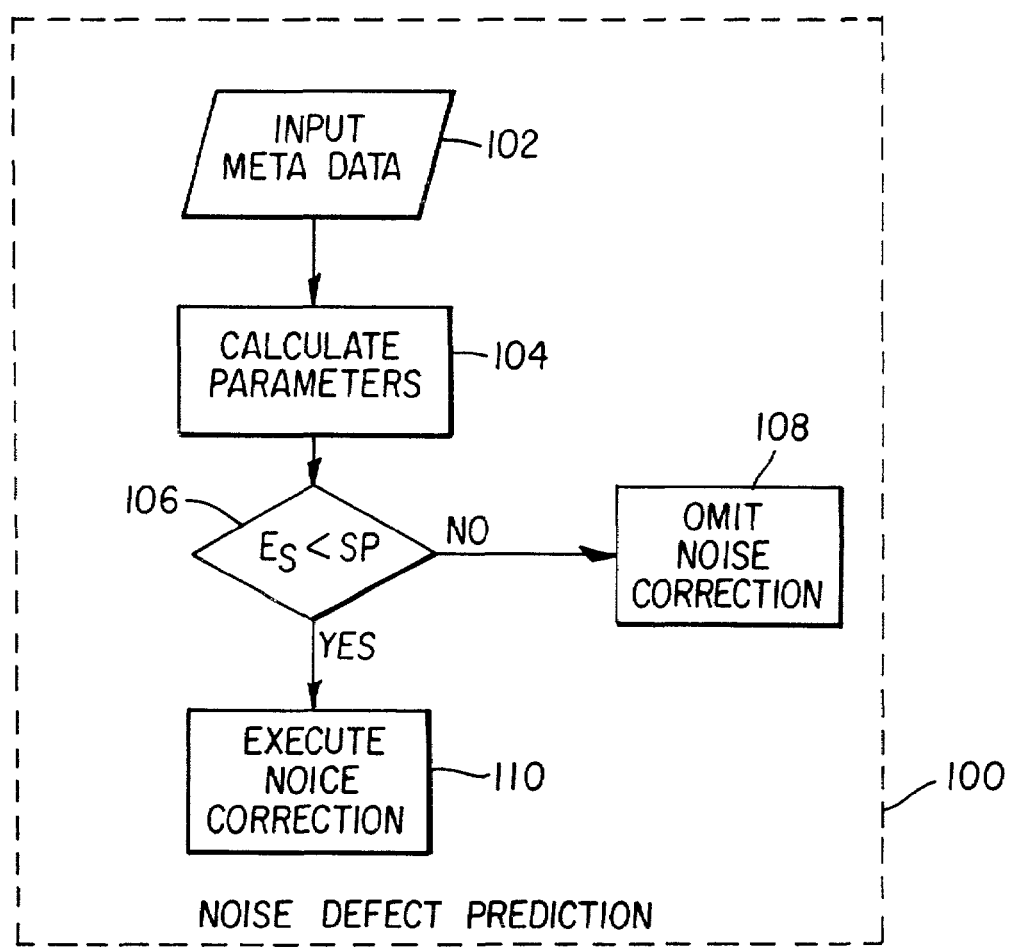
FIG. 3 is a logic diagram illustrating one technique of using data captured at the time of image capture to decide when to apply noise defect location and correction processes in digital image reproduction apparatus.

FIG. 3: Noise Defect Prediction Block 100

Block 102: Meta Data Input List
Camera Model Data
K,Ms,Mn,D,LLs,f,T,GNm

Block 104: Processes
Calculate Vd EQ. 12
Calculate DSF EQ. 14
Calculate Esf EQ. 4

Calculate Esa EQ. 5

Select a switch point from the SP Table appropriate for current display size factor (DSF) and Film Speed (S).

Block 106: Decision Point

Compare the Calculated Es and SP Values:
If calculated Es>=SP, omit noise correction process 108;
If calculated Es<SP, execute noise correction process 110;

In cases where the noise level of the current capture media and DSF combination does not require noise correction at any exposure (Es) level, an SP value substantially below any obtainable by the system (e.g. −100) is entered in the table. In cases where the noise level of the current capture media and DSF combination requires noise correction at every exposure (Es) level, an SP value substantially above any obtainable by the system is entered in the table.

TABLE 1

SP (Es) Values for Block 106 (3 JND Level)

| Speed S -> | ISO 100 | ISO 200 | ISO 400 |
|---|---|---|---|
| Es @ DSF = 1.00 | −100 | −0.52 | −0.30 |
| Es @ DSF = 0.85 | −0.48 | −0.13 | 0 |
| Es @ DSF = 0.63 | +0.25 | +1.08 | +100 |

Table 1 shows the Es ($\log_{10}$ Exposure units) SP values for three display sizes and three film speeds. In this example, the DSF values are appropriate for a full-frame 35-mm format consumer grade color negative film frame enlarged to make a 4×6 inch print (DSF 1.0), a full-frame 35-mm format consumer grade color negative film frame enlarged to make a 5×7 inch print (DSF=0.85), and a full-frame 35-mm format consumer grade color negative film frame enlarged to make a 8×12 inch print (DSF=0.63). Since the noise versus exposure relationship may vary depending on the film technologies selected by the manufacturer, it may be necessary to employ different SP values for other film types. This is easily verified by shooting an exposure series on the new film and assessing the noise level in the final images. In the preferred embodiment, the SP Table includes all of the DSF possibilities for the particular image processing apparatus. For example, some digital printers may only produce prints with fixed magnifications, as shown in the current example, while others may offer a wide range of print sizes and intermediate zoom ratios. In these more versatile printers, the Noise SP Table preferably contains DSF entries corresponding to each print size and zoom magnification. Alternatively, intermediate SP values can be obtained by interpolating between values in the table.

The Noise SP Table for digital still cameras (DSCs) also varies with respect to DSF; however, rather than loading in films with different sensitivities, as shown above, the photographer or camera exposure control selects a Digital Gain Factor (DG) appropriate for the current scene. Therefore, the DSC Noise SP Table lists DSF versus DG. The 3 JND quality loss values populating the DSC Noise SP Table can be derived with the empirical photographic testing and perceptual evaluations referenced above, alternatively, the values can be generated using the methods referenced by the present inventors in the aforementioned articles entitled "*Characterization and Prediction of Image Quality*" by B. W. Keelan, and "*Use of System Image Quality Models to Improve Product Design*" by R. B. Wheeler.

Figure 4:
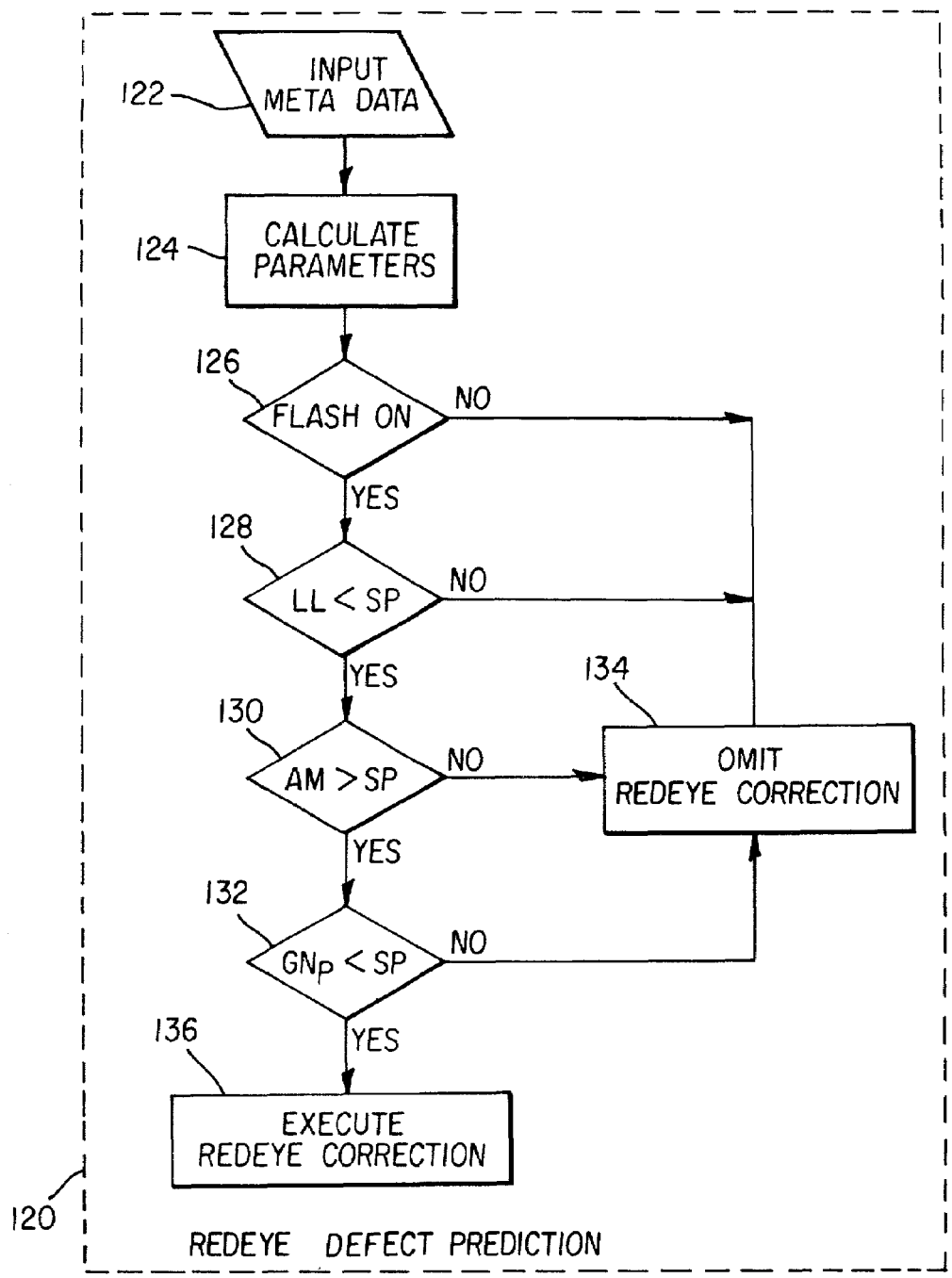
FIG. 4 is a logic diagram illustrating one technique of using data captured at the time of image capture to decide when to apply redeye defect location and correction processes in digital image reproduction apparatus.

FIG. 4: Redeye Defect Prediction Block 120

Block 122: Meta Data Input List
Demographic Data (user-specified or region-specific)
Camera Model Data
FF,FLS,LLs,FL,Mc,D,GNp,Ds The severity of redeye is a strong function of demographic classification of the subject photographed, due to two effects. First, more highly pigmented races tend to have more melanin in their pupils, which attenuates the light propagating through the pupil via absorption, and reduces the amount of red light exiting the eye. Second, as people age, the maximum diameter to which their pupil will dilate at low light levels decreases. Consequently, young people exhibit larger pupil sizes than older people under the conditions in which flash photographs are typically taken. The dramatic nature of the dependence of redeye severity on demographics is demonstrated in Table 2, which shows the frequency of occurrence of noticeable redeye in over one hundred subjects belonging to different demographic groups and photographed under rigidly controlled conditions (0.016 foot-candles ambient light; 2.6 inch flash-to-lens separation; subject distance 6 feet; no preflash; focal length 80 mm; normally viewed 4×6 inch print from 35-mm format film).

TABLE 2

Effect of Demographics on Frequency of Redeye

| Demographic Group | Caucasian Youth | Caucasian Adult | Hispanic | Asian | African-American |
|---|---|---|---|---|---|
| Frequency of Occurrence | 82% | 70% | 41% | 15% | 9% |

Both the pigmentation and age affects are evident in this data, although the age effect is more obvious at larger flash-to-lens separation (e.g. at 3.8 inches, with other parameters the same), where Caucasian adults exhibit redeye only 20% of the time, but Caucasian youth show redeye in 67% of photographs.

The SP Tables employed in Redeye Defect Prediction Block 120 at points 128, 130 and 132 may contain different values depending on the demographic characteristics supplied. If no demographic data is available, the SP Tables for Caucasian Adult, which are shown hereafter in the preferred embodiment, are used as the default.

The flash-to-lens separation (FLS) has a significant impact on the level of redeye defect. However, FLS is a fixed value in most cameras (flash is stationary); therefore, the SP Tables employed in Redeye Defect Prediction Block 120 at points 128, 130 and 132 would typically contain SP values derived from the quality evaluation of images produced with the FLS of the current camera. To accommodate cameras capable of changing the FLS in response to the photographer's lens focal length (FL) selection, for example, as disclosed in U.S. Pat. No. 5,331,362, which issued 19 Jul. 1994 and is incorporated herein by reference, the current invention employs a separate SP Table for each FL (zoom setting) selected by the photographer.

Table 3 shows the affect of FLS on image quality (JNDs) for the following system: Caucasian adult population; 0.5 foot lamberts ambient light; subject distance 10 feet; no preflash; unit angular magnification; normally viewed 4×6 inch print from 35-mm format film.

TABLE 3

Effect of FLS on Redeye Defect Level

| FLS (inches) | 1.0 | 1.5 | 2.5 | 3.5 |
|---|---|---|---|---|
| Quality Loss (JND Units) | −4.9 | −3.25 | −1.4 | −0.4 |

The SP Tables employed in Redeye Defect Prediction Block 120 at points 128, 130 and 132 are loaded with values that correspond to the specific FLS value supplied in the meta data.

Empirical studies show that the quality loss due to the redeye image defect is greatest at an intermediate camera-to-subject distance (Ds), which falls within the range commonly occurring in consumer photography. This is due to the competition of two opposing effects: (1) At longer camera-to-subject distance, the angular separation of the flash and lens is reduced, leading to greater red saturation of the pupil, and, (2) At longer distances, the pupil size in the final image is diminished, reducing redeye severity. To a crude approximation, as distance increases, the redeye becomes more intensely red but the pupil size in the image decreases. The former effect dominates at short distances and the latter at longer distances, leading to an extremum in the relationship at intermediate distances. As a result of this finding, the SP Tables employed in Redeye Defect Prediction Block 120 at points 128, 130 and 132 in the preferred embodiment are populated with values corresponding to the critical camera-to-subject distance, which is defined as the distance producing the most severe defect level. This approach ensures that Redeye Correction Process 80 is applied when the probability of redeye is high but Ds meta data is not available. If Ds meta data is available, and added predictive accuracy is desired, SP Tables for each distance can be advantageously applied.

Block 124: Processes
Calculate Vd EQ. 12
Calculate AM EQ. 11

Select switch points from SP Tables appropriate for current demographic group and flash-to-lens separation (FLS).

Block 126: Decision Point

Determine the Flash Fire State (FF):
If FF is no (off); omit redeye correction process 134;
If FF is yes (on); proceed to Block 128;

Block 128: Decision Point

Compare the Actual LL and SP Values:
If actual LL>=SP, omit redeye correction process 134;
If actual LL<SP, proceed to Block 130;

TABLE 4

SP (LL) Values for Block 128 (3 JND Level)

| FLS (inches) | 1.0 | 1.5 | 2.5 | 3.5 |
|---|---|---|---|---|
| LL (foot lamberts) | 2.50 | 1.04 | 0.48 | 0.19 |

Table 4 shows SP value (LL in foot Lamberts) for the critical distance for each FLS with AM at 1.5, which is a demanding case of the sort found on typical 3x zoom cameras. If FLS is not supplied in meta data, a value of one inch (smallest separation found on consumer cameras) is assumed.

Block 130: Decision Point

Compare the Calculated AM and SP Values:
If calculated AM=<SP, omit redeye correction process 134;
If calculated AM>SP, proceed to Block 132;

TABLE 5

SP (AM) Values for Block 130 (3 JND Level)

| LL (foot lamberts) | 2.5 | 1.0 | 0.5 | 0.2 |
|---|---|---|---|---|
| AM | 1.5 | 0.82 | 0.62 | 0.43 |

Table 5 shows SP value for FLS of 1.0 inches and the critical distance for each AM. If LL is not supplied in meta data, a value of 0.2 foot lamberts is assumed.

Block 132: Decision Point

Compare the Actual GNp and SP Values:
If actual GNp>=SP, omit redeye correction process 134;
If actual GNp<SP, execute noise correction process 136->80;

TABLE 6

SP (GNp) Values for Block 132 (3 JND Level)

| AM | 1.5 | 1.2 | 0.9 | 0.43 |
|---|---|---|---|---|
| GNp | 160 | 70 | 15 | 0 |

Table 6 shows SP value for FLS of 1.0 inches, at the minimum light level for typical flash pictures (0.2 foot lamberts), and the critical distance for each AM. When the AM is above 1.2, the preflash guide number (GNp) values needed to produce less than 3 JNDs of quality loss indicate higher output than is typically found on consumer cameras; whereas, when the AM is below 0.43, the quality loss due to the redeye defect will be less than 3 JNDs with no preflash applied.

Figure 5:
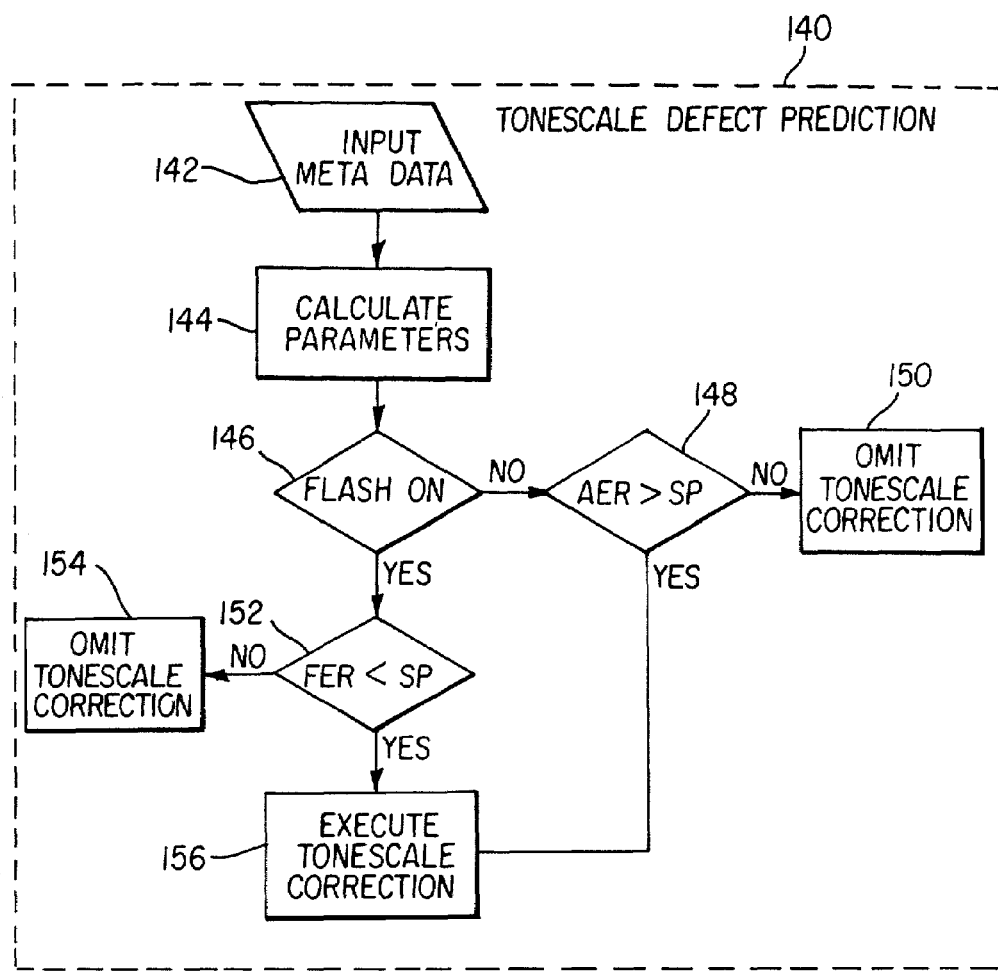
FIG. 5 is a logic diagram illustrating one technique of using data captured at the time of image capture to decide when to apply tonescale defect location and correction processes in digital image reproduction apparatus.

FIG. 5: Tonescale Defect Prediction Block 140

Block 142: Meta Data Input List
Camera Model Data
FF,GNm,S,f,T,K,LLs,LLb,Ds,Db Block 144: Processes
Calculate Esa EQ. 5
Calculate Eba EQ. 8
Calculate Esf EQ. 4
Calculate Ebf EQ. 7
Calculate AER EQ. 10
Calculate FER EQ. 9

Block 146: Decision Point

Determine the Flash Fire State (FF):
If FF is no (off); proceed to Block 148;
If FF is yes (on); proceed to Block 152;

Block 148: Decision Point

Compare the Calculated AER and SP Values:
If actual AER=<SP, omit tonescale correction process 150;
If actual AER>SP, execute tonescale correction process 156;

Alternatively, if the AER parameter is not available, but the backlight indicator (BL) is on, execute tonescale correction process 156.

Block 152: Decision Point

Compare the Calculated FER and SP Values:
If actual FER=<SP, omit tonescale correction process 154;
If actual FER>SP, execute tonescale correction process 156;

Where SP=2.8, which corresponds to a 1.5 stop exposure ratio.

The preferred value for AER and FER was derived from a review of numerous images with a wide range subject and background exposure ratios, together with learning from the optimization of fill-flash algorithms, as disclosed by the present inventors in columns 50–58 of the aforementioned U.S. Pat. No. 5,323,204. The SP value of 2.8 was selected because we found that it provides a reasonable balance between image quality enhancement and photofinishing throughput (images processed per unit of time). If the values for AER and FER are set to a lower JND value, the tonescale image defect location and correction processes will be invoked more frequently, which may lead to higher average image quality, but lower throughput due to extended image processing time. If the values for AER and FER are set to a higher JND value, the image defect location and correction processes will be invoked less frequently, which may lead to lower average image quality, but higher throughput due to shortened image processing time.

Figure 6:
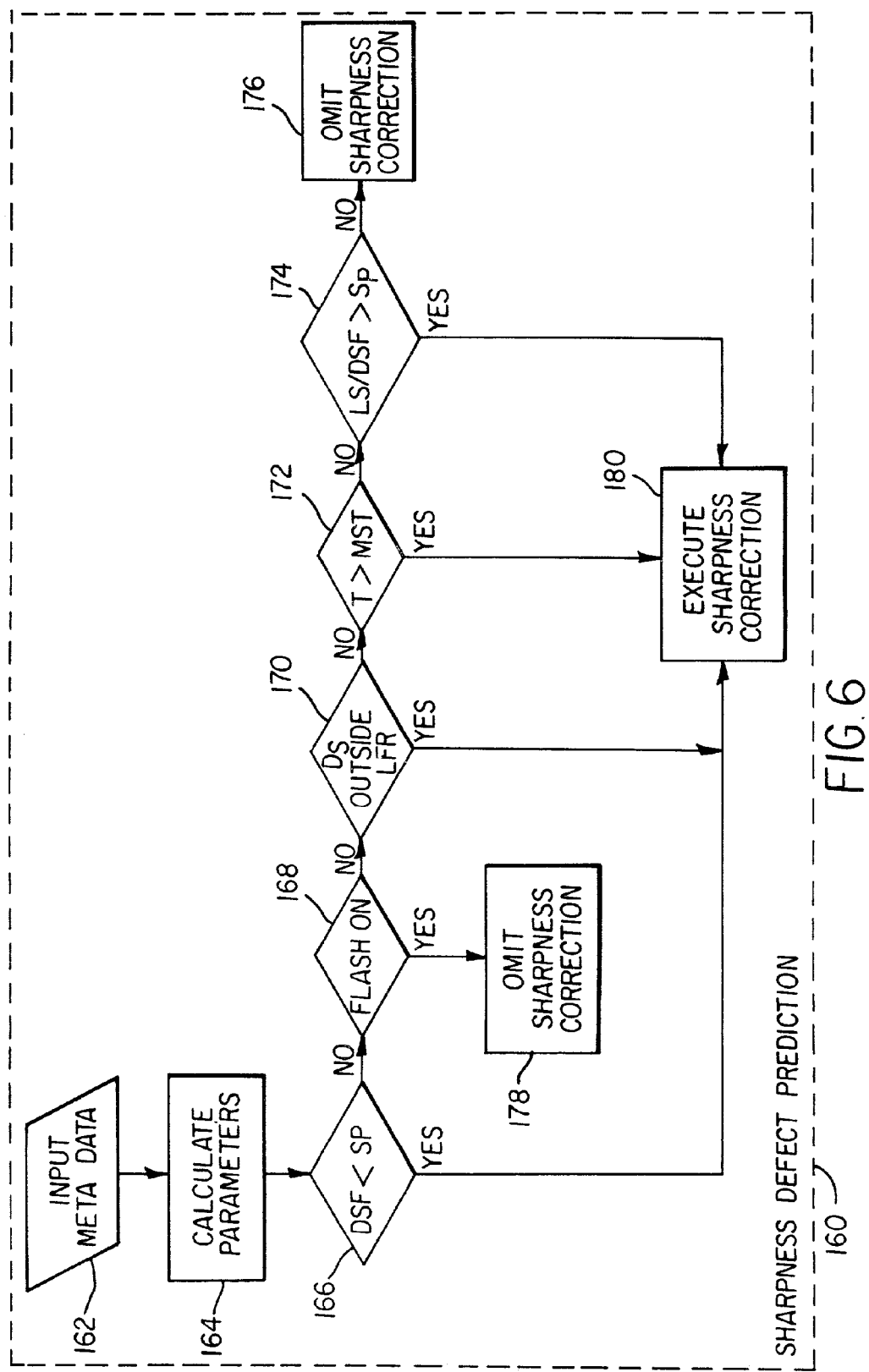
FIG. 6 is a logic diagram illustrating one technique of using data captured at the time of image capture to decide when to apply sharpness defect location and correction processes in digital image reproduction apparatus.

FIG. 6: Sharpness Defect Prediction Block 160

Block 162: Meta Data Input List
Camera Model Data
Ms,Mn,Mc,LFR,FL,T,CSF,LS

Block 164: Processes
Calculate DSF EQ. 14
Calculate Vds EQ. 12
Calculate Vdn EQ. 12
Calculate AM EQ. 11
Calculate MST EQ. 13

Block 166: Decision Point

Compare the Display Size Factor (DSF) and SP:
If actual DSF>=SP, proceed to Block 168;
If actual DSF<SP, execute sharpness 180;
Where SP=0.65, which produces about 3 JNDs of quality loss for typical consumer imaging systems.

Block 168: Decision Point

Determine the Flash Fire State (FF):
If FF is no (oft); proceed to Block 170;
If FF is yes (on); omit sharpness correction process 178;

Block 170: Decision Point

Determine the Lens Focus Range State (LFR):
If Ds is not outside LFR; proceed to Block 172;
If Ds is outside LFR; execute sharpness correction process 180;

Block 172: Decision Point

Compare the Actual Exposure Time T and MST:
If T is =<MST, proceed to Block 174;
If T is >MST, execute sharpness correction process 180;

Block 174: Decision Point

Measure the Linear Smear at Image Capture Plane (LS):
If LS/DSF is =<SP, omit sharpness correction process 176;
If LS/DSF is >SP, execute sharpness correction process 180;
Where LS=0.04 mm at image capture plane, which produces about 3 JNDs of quality loss with unit DSF.

Linear smear may be determined in a variety of ways, including the following. The aforementioned U.S. Pat. No. 5,323,204 described in element 225 of FIG. 2, and the hardware description beginning in column 26, line 38, an accelerometer-based camera shake detector capable of measuring linear smear. Alternatively, linear smear at the image plane can be acquired by taking temporally separated auto-focusing system readings and comparing the linear translation of the signal patterns (e.g. quantifying the displacement of matching signal profiles as a function of acquisition time).

The image defect prediction processes 100,120,140,160, as described above, have shown the preferred embodiments, but it is to be understood that they may be advantageously applied, even if all of the data is not available. For example, the hierarchy is purposefully set so the most readily available data is required earliest in each process, and if data is missing, the decision of the last block containing data has priority. For example, if after the first decision point, the data suggests that there is a probability of an image defect, but no additional data is available, the defect correction process will be executed. This is acceptable, because a "mistake" based on omission of data, simply means that a defect correction may be occasionally applied when not needed. This will not reduce the image quality, but merely lead to a slight reduction in the throughput advantage produced by the preferred embodiment.

The invention has been described with reference to a preferred embodiment. However, it will be appreciated that variations and modifications can be effected by a person of ordinary skill in the art without departing from the scope of the invention. For instance, while the foregoing description discloses an image processing system incorporating a plurality of image defect location and correction processes that are each associated with correction of a different type of image defect, the invention is intended to encompass an image processing system incorporating a plurality of image defect location and correction processes that are each associated with a specific type of image defect, where the specific type may be a different type or the same defect. The latter situation may apply when two or more processes are applied in series to the same defect depending on severity levels, or different processes may be applied individually for different severity levels of the same type of defect or depending upon the source of the defect.

PARTS LIST 10 image processing system
12 film scanner
14 digital file reader
16 network input
18 order entry station
22 display monitor
24 keyboard
26 printer
28 photofinishing equipment
30 data communication device
32 photofinishing lab
40 computer
50 image acquisition block
52 capture device/film scanner
56 source digital image
60 image analysis block 62 sub-sampling block
64 scene balance algorithm
66 meta data decoder
68 image defect prediction process
70 image processing block
72 noise correction process
76 scene balance shift
80 redeye correction process
84 scene dependent tonescale correction
88 sharpness correction process
90 image output block
92 output device rendering
96 image output device
100 noise defect prediction block
102 meta data input list
104 parameter calculation
106 subject exposure switch point
108 omit noise correction
110 execute noise correction
120 redeye defect prediction block
122 meta data input list
124 parameter calculation
126 flash determination
128 light level switch point
130 angular magnification switch point
132 flash output switch point
134 omit redeye correction
136 execute redeye correction
140 tonescale defect prediction block
142 meta data input list
144 parameter calculation
146 flash determination
148 ambient exposure ratio switch point
150 omit tonescale correction
152 flash exposure ratio switch point
154 omit tonescale correction
156 execute tonescale correction
160 sharpness defect prediction block
162 meta data input list
164 parameter calculation
166 display size factor switch point
168 flash determination
170 lens focus range switch point
172 actual exposure time switch point
174 linear smear switch point
176 omit sharpness correction
178 omit sharpness correction
180 execute sharpness correction
200 film camera
201 film strip
205a film reel
205b film reel
210 read/write head
215 microprocessor
220 head electronics
225 camera controls
230 scene sensors
240 ROM
250 ROM
260 RAM
300 digital camera
340 lens
341 aperture/shutter controller
342 blur filter
344 CCD sensor
346 analog video processor
348 A/D converter
350 frame memory
352 digital signal processor
354 data memory
356 memory card
358 memory card interface
359 card connector
360 host computer interface
362 camera microprocessor
364 user inputs
366 flash unit
368 timing generator
370 scene sensor
372 exposure driver
374 sensor driver
380 camera mechanism inputs
382 shake sensor input

What is claimed is:

1. A method for processing a captured image, said method comprising the steps of:
collecting meta data related to the captured image;
calculating intermediate parameter values using said meta data;
computing predictions of a plurality of different perceived quality reducing defects in the captured image, at least one of said predictions using both said meta data and said intermediate parameter values, and said plurality of defects being exclusive of scene balance;
adjusting scene balance of the captured image independent of said predictions; and
applying one or more of a plurality of different correction processes on the captured image responsive to said predictions.

2. The method of claim 1 wherein said intermediate parameter values quantify one or more of: degree of exposure of subject, normal exposure light level, degree of exposure of background, flash exposure ratio, ambient exposure ratio, angular magnification of the subject, final image viewing distance, maximum handheld shutter time, and display size factor.

3. The method as claimed in claim 1 wherein the meta data includes scene, camera or demographic data related to image capture of the captured image.

4. The method as claimed as in claim 3 wherein the meta data related to image capture is collected at the time of image capture.

5. The method as claimed as in claim 3 wherein the meta data related to image capture is collected at a time other than the time of image capture.

6. The method as claimed in claim 3 wherein the image capture is an electronic capture on a digital capture device and the capture variables includes at least one variable selected from the group consisting of an ISO equivalent rating of an image sensor used by the capture device, exposure time of an optical system used in the capture device, a f-number of the optical system, a distance of a subject from the capture device, a distance of a background from the capture device, an illumination level on the subject, an illumination level on the background, a distance between a flash illuminator and the optical system, an indication of whether the flash illuminator was used, a guide number for the flash illuminator, an indication of camera shake, an indication that a backlight indicator was turned on, a gain factor for the image sensor and a resolution setting of the capture device.

7. The method as claimed in claim 6 wherein the electronic capture is obtained with a digital camera.

8. The method as claimed in claim 6 wherein the electronic capture is obtained with a digital scanner.

9. The method as claimed in claim 1 wherein said computing predictions includes predicting the severity of respective said image defects and the method further comprises altering the strength of the corresponding correction processes in response to the respective degree of severity.

10. The method as claimed in claim 1 wherein one of the defects is a noise defect and the meta data is selected from the group consisting of a lens exposure constant, standard (printing) reproduction magnification, non-standard (enlargement) magnification, diagonal dimension of a final display, ambient light level of the primary subject, exposure time, camera lens f-number, and main flash guide number.

11. The method as claimed in claim 1 wherein one of the defects is a red-eye defect due to flash illumination of a subject and the meta data is selected from the group consisting of a use (on-off) of the flash illumination, illumination level of the primary subject, subject distance, flash-to-camera lens separation, focal length of camera lens, current reproduction (printing) magnification, diagonal dimension of final display, and preflash guide number.

12. The method as claimed in claim 1 wherein one of the defects is a tone scale defect and the meta data is selected from the group consisting of respective illumination levels of the subject and background, subject distance, background distance, exposure time, camera lens f-number, use (on/off) of flash illumination, guide number of a main flash, lens exposure constant and ISO speed of a capture device.

13. The method as claimed in claim 1 wherein one of the defects is a sharpness defect and the meta data is selected from the group consisting an exposure time, standard reproduction (printing) magnification, non-standard (enlargement) magnification, current reproduction (printing) magnification, camera lens focus range, camera lens focal length, camera shake factor and linear smear.

14. The method as claimed in claim 1 wherein said applying step provides a viewed image and said method further comprises the step of collecting meta data related to display parameters of the viewed image, wherein said meta data is capable of indicating whether the specific types of image defects are likely to be present in the viewed image.

15. A computer storage medium having instructions stored therein for causing a computer to perform the method of claim 1.

16. A system for processing a captured image, said system comprising:
   means for collecting meta data related to the captured image;
   means for calculating intermediate parameter values using said meta data;
   means for computing predictions of a plurality of different perceived quality reducing defects in the captured image, at least one of said predictions using both said meta data and said intermediate parameter values, and said plurality of defects being exclusive of scene balance;
   means for adjusting scene balance of the captured image independent of said predictions; and
   means for applying one or more of a plurality of different correction processes on the captured image responsive to said predictions.

17. The system of claim 16 wherein said intermediate parameter values quantify one or more of: degree of exposure of subject, normal exposure light level, degree of exposure of background, flash exposure ratio, ambient exposure ratio, angular magnification of the subject, final image viewing distance, maximum handheld shutter time, and display size factor.

18. The system as claimed in claim 16 wherein the meta data includes scene, camera or demographic data related to image capture of the captured image.

19. The system as claimed in claim 16 wherein said means for computing predictions also predicts the severity of the defects based at least in part on the meta data and said means for applying the selected correction process alters the strength of the corresponding correction processes in response to the degree of severity.

20. The system as claimed as in claim 16 wherein said means for collecting meta data is part of an image capture device and at least some of the meta data is related to image capture and is collected at the time of image capture of the captured image.

21. The system as claimed as in claim 16 wherein said means for collecting meta data is separated from an image capture device used to capture said captured image.

22. The system as claimed in claim 16 wherein said means for applying provides a viewed image and at least some of said meta data is related to display parameters of the viewed image and indicates whether the specific types of image defects are likely to be present in the viewed image.

23. A method for processing a captured image, said method comprising the steps of:
   collecting meta data related to the captured image;
   computing predictions of a plurality of different perceived quality reducing defects in the captured image using said meta data, said plurality of defects being exclusive of scene balance;
   adjusting scene balance of the captured image independent of said predictions; and
   applying one or more of a plurality of different correction processes on the captured image responsive to said predictions;
   further comprising calculating intermediate parameter values using said meta data and wherein said computing further comprises determining at least one of said predictions using both said meta data and said intermediate parameter values.

24. The method of claim 23 wherein said plurality of defects includes each of: a noise defect, a redeye defect, a tone scale defect, and a sharpness defect.

25. The method of claim 23 wherein said predictions predict both presence and severity.

26. The method of claim 23 wherein said intermediate parameter values quantify one or more of: degree of exposure of subject, degree of exposure of background, angular magnification of the subject, final image viewing distance, maximum handheld shutter time, and display size factor.

27. A computer storage medium having instructions stored therein for causing a computer to perform the method of claim 23.

28. The method of claim 23 wherein:
   said meta data identifies a demographic characteristic related to redeye;
   one of said predictions is a prediction of presence and severity of redeye defect in the captured image; and
   said applying includes applying a redeye defect correction process on the captured image responsive to said prediction of redeye.

29. The method as claimed in claim 28 wherein the demographic characteristic of the image includes the age or race of the human subject.

30. A computer storage medium having instructions stored therein for causing a computer to perform the method of claim 28.

31. A system for processing a captured image, said system comprising:

means for collecting meta data related to the captured image;

means for computing predictions of a plurality of different perceived quality reducing defects in the captured image using said meta data, said plurality of defects being exclusive of scene balance;

means for adjusting scene balance of the captured image independent of said predictions; and means for applying one or more of a plurality of different correction processes on the captured image responsive to said predictions;

further comprising means for calculating intermediate parameter values using said meta data and wherein said means for computing further comprises means for determining at least one of said predictions using both said meta data and said intermediate parameter values.

32. The system of claim 31 wherein said plurality of defects includes each of: a noise defect, a redeye defect, a tone scale defect, and a sharpness defect.

33. The system of claim 31 wherein said predictions predict both presence and severity.

34. The system of claim 31 wherein said intermediate parameter values quantify one or more of: degree of exposure of subject, degree of exposure of background, angular magnification of the subject, final image viewing distance, maximum handheld shutter time, and display size factor.

35. The method of claim 31 wherein:

said meta data identifies a demographic characteristic related to redeye;

one of said predictions is a prediction of presence and severity of redeye defect in the captured image; and said means for applying includes means for applying a redeye defect correction process on the captured image responsive to said prediction of redeye.

* * * * *